United States Patent [19]

Miyane et al.

[11] Patent Number: 5,621,466
[45] Date of Patent: Apr. 15, 1997

[54] METHOD AND APPARATUS FOR COMPRESSING AND DECOMPRESSING IMAGE DATA USING TWO DIMENSIONAL ORTHOGONAL TRANSFORM WITH IMPROVED COMPRESSION RATE

[75] Inventors: Toshiki Miyane; Uichi Sekimoto, both of Suwa, Japan

[73] Assignee: Seiko Epson Corporation, Tokyo, Japan

[21] Appl. No.: 594,375

[22] Filed: Jan. 30, 1996

Related U.S. Application Data

[63] Continuation of Ser. No. 466,511, Jun. 6, 1995, abandoned, which is a continuation of Ser. No. 127,533, Sep. 28, 1993, abandoned.

[30] Foreign Application Priority Data

Sep. 28, 1992 [JP] Japan .................... 4-258398
Mar. 25, 1993 [JP] Japan .................... 5-066831

[51] Int. Cl.[6] .................. H04N 7/30; H04N 7/32
[52] U.S. Cl. .............. 348/405; 348/406; 348/404
[58] Field of Search ............... 348/405, 406, 348/408, 410, 419, 404, 384, 390; H04N 7/30, 7/32

[56] References Cited

U.S. PATENT DOCUMENTS 5,038,209  8/1991  Hang ........................ 348/405
5,107,345  4/1992  Lee ........................... 348/403
5,146,325  9/1992  Ng ............................ 348/384
5,157,488  10/1992  Pennebaker ............... 348/405
5,216,712  6/1993  Shimoda et al. ........... 348/405
5,253,078  10/1993  Backanski et al. ........ 358/432
5,280,349  1/1994  Wang et al. ............... 348/390
5,291,282  3/1994  Nakagana et al. ........ 348/384
5,295,077  3/1994  Fukuoka .................... 348/405
5,301,040  4/1994  Hoshi et al. .............. 348/384

*Primary Examiner*—Thai Q. Tran
*Assistant Examiner*—Vu Le
*Attorney, Agent, or Firm*—Oblon, Spivak, McClelland, Maier & Neustadt, P.C.

[57] ABSTRACT

The compressed image data ZZ includes code data representing a quantization level coefficient QCx inserted between block data units. DCT coefficients QF(u,v) and a quantization level coefficient QCx, which are decoded form the compressed image data ZZ, are multiplied in the inverse quantization table generator 250 to generate a quantization table QT, and the inverse quantization unit 250 executes inverse quantization with the quantization table QT. Since the quantization level coefficient QCx is inserted between block data units in the compressed image data, the quantization table QT is renewed every time when a new quantization level coefficient QCx is decoded. The compressed image data also includes a special type of data, or null run data, representing a series of pixel blocks having an identical image pattern.

13 Claims, 29 Drawing Sheets

Fig. 6(a) DCT COEFFICIENTS F(u,v)

| 7 | 4 | 5 | 4 | -2 | 1 | 0 | 0 |
|---|---|---|---|----|---|---|---|
| 4 | 2 | 7 | 3 | -1 | -1 | 0 | 0 |
| 5 | 9 | 2 | 0 | 1 | -1 | 0 | 0 |
| 2 | 1 | 0 | 0 | 0 | 0 | 0 | 0 |
| -1 | -1 | -1 | 0 | 0 | 0 | 0 | 0 |
| 1 | 2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

ORIGINAL IMAGE DATA $f(x,y)$ → DCT

Fig. 6(b) QUANTIZED DCT COEFFICIENTS QF(u,v)

| 7 | 2 | 1 | 1 | 0 | 0 | 0 | 0 |
|---|---|---|---|---|---|---|---|
| 2 | 1 | 2 | 0 | 0 | 0 | 0 | 0 |
| 2 | 1 | 3 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 6(c) BASIC QUANTIZ. TABLE BQT

| 1 | 2 | 3 | 4 | 10 | 15 | 15 | 15 |
|---|---|---|---|----|----|----|----|
| 2 | 2 | 3 | 4 | 15 | 15 | 15 | 15 |
| 3 | 3 | 4 | 15 | 15 | 15 | 15 | 15 |
| 4 | 4 | 15 | 15 | 15 | 15 | 15 | 15 |
| 10 | 15 | 15 | 15 | 15 | 15 | 15 | 15 |
| 15 | 15 | 15 | 15 | 15 | 15 | 15 | 15 |
| 15 | 15 | 15 | 15 | 15 | 15 | 15 | 15 |
| 15 | 15 | 15 | 15 | 15 | 15 | 15 | 15 |

× QCx

Fig. 6(d) QUANTIZ. TABLE QT

| 1 | 2 | 3 | 4 | 10 | 15 | 15 | 15 |
|---|---|---|---|----|----|----|----|
| 2 | 2 | 3 | 4 | 15 | 15 | 15 | 15 |
| 3 | 3 | 4 | 15 | 15 | 15 | 15 | 15 |
| 4 | 4 | 15 | 15 | 15 | 15 | 15 | 15 |
| 10 | 15 | 15 | 15 | 15 | 15 | 15 | 15 |
| 15 | 15 | 15 | 15 | 15 | 15 | 15 | 15 |
| 15 | 15 | 15 | 15 | 15 | 15 | 15 | 15 |
| 15 | 15 | 15 | 15 | 15 | 15 | 15 | 15 |

Fig. 6(e) COMPRESSED DATA ZZ
$$\begin{Bmatrix} \cdot BQT \\ \cdot QCx \\ \cdot QF(u,v) \end{Bmatrix}$$

Fig. 6(f) DECODED QUANTIZED COEFFICIENTS QF(u,v)

| 7 | 2 | 1 | 1 | 0 | 0 | 0 | 0 |
|---|---|---|---|---|---|---|---|
| 2 | 1 | 2 | 0 | 0 | 0 | 0 | 0 |
| 2 | 1 | 3 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 6(g) DECODED COEFFICIENTS FF(u,v)

| 7 | 4 | 5 | 4 | 0 | 0 | 0 | 0 |
|---|---|---|---|---|---|---|---|
| 4 | 2 | 6 | 0 | 0 | 0 | 0 | 0 |
| 3 | 9 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

RECONSTRUCTED IMAGE DATA $ff(x,y)$ ← IDCT

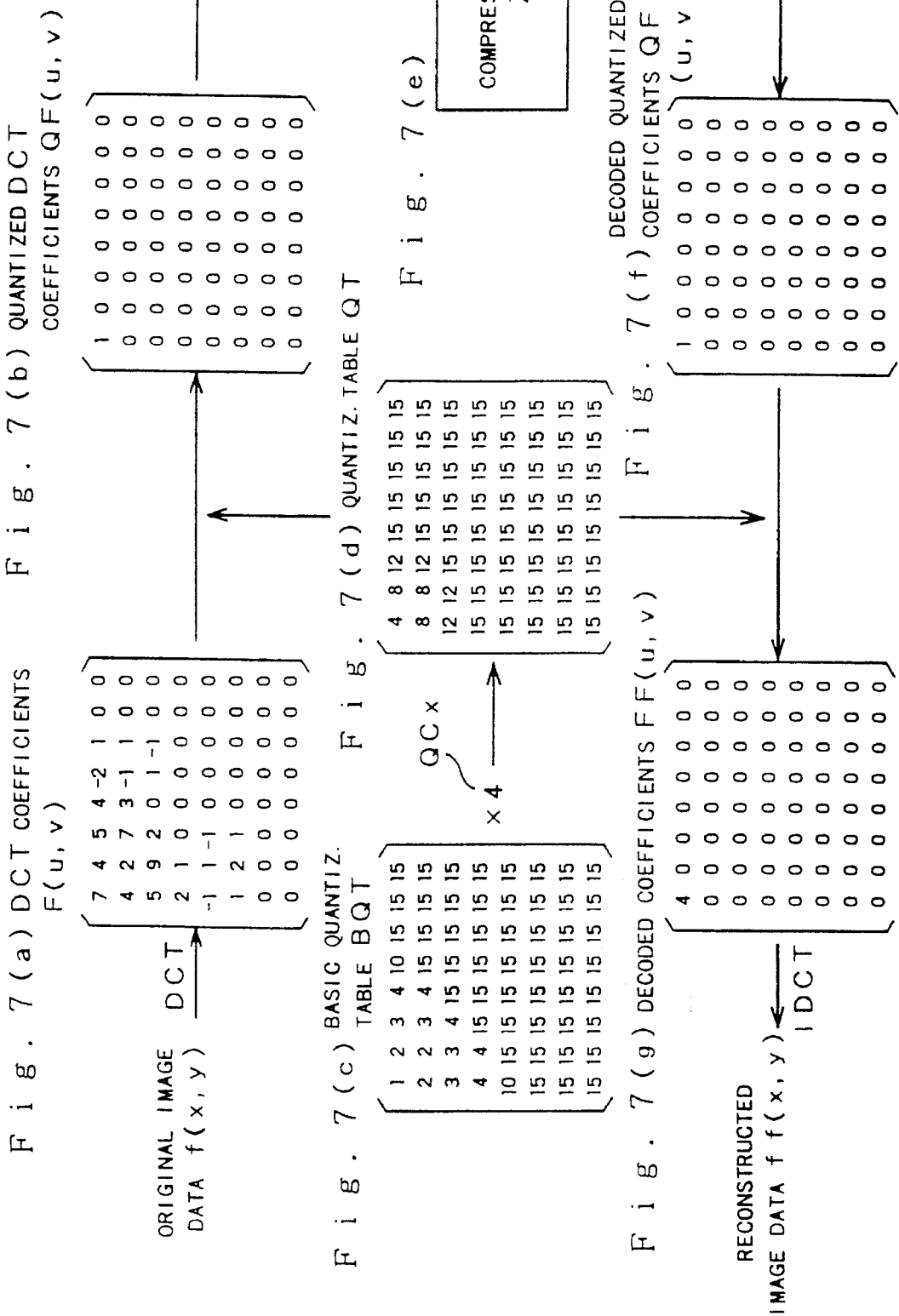

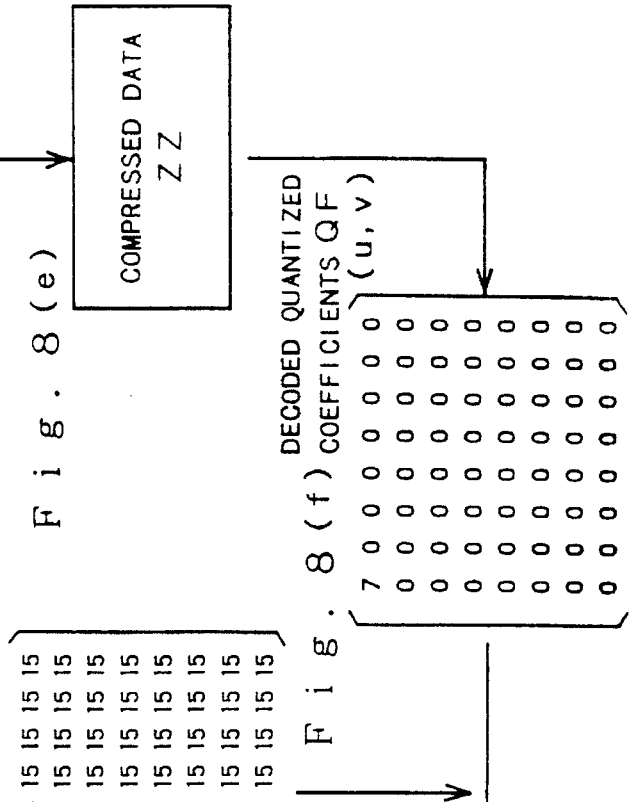

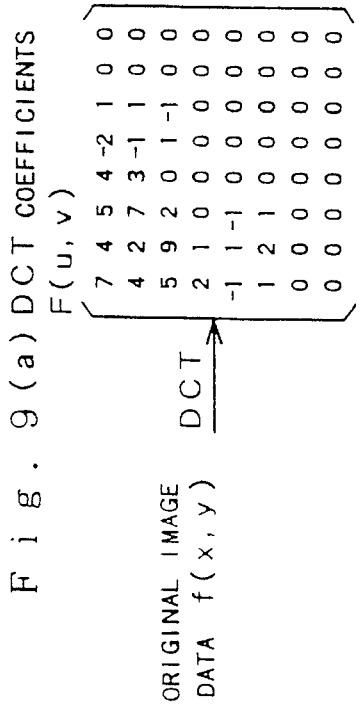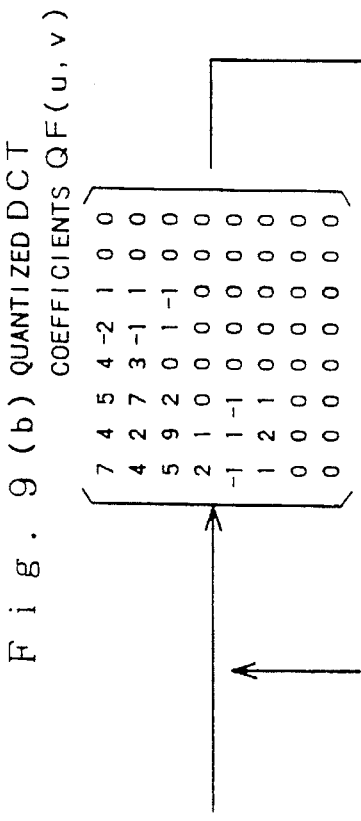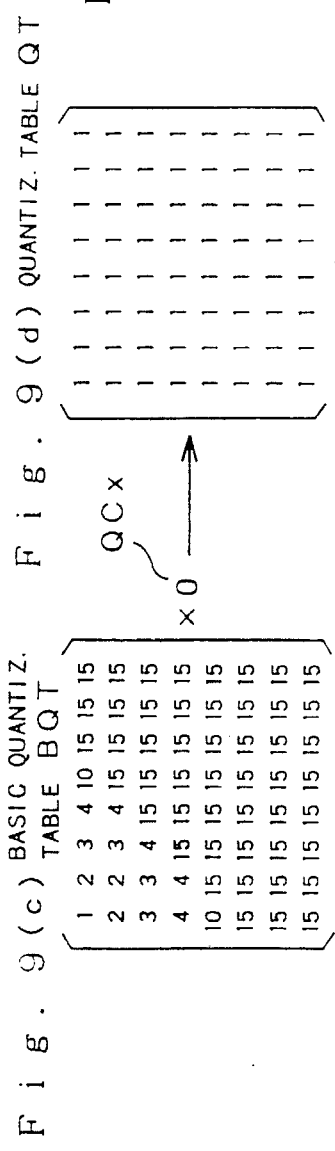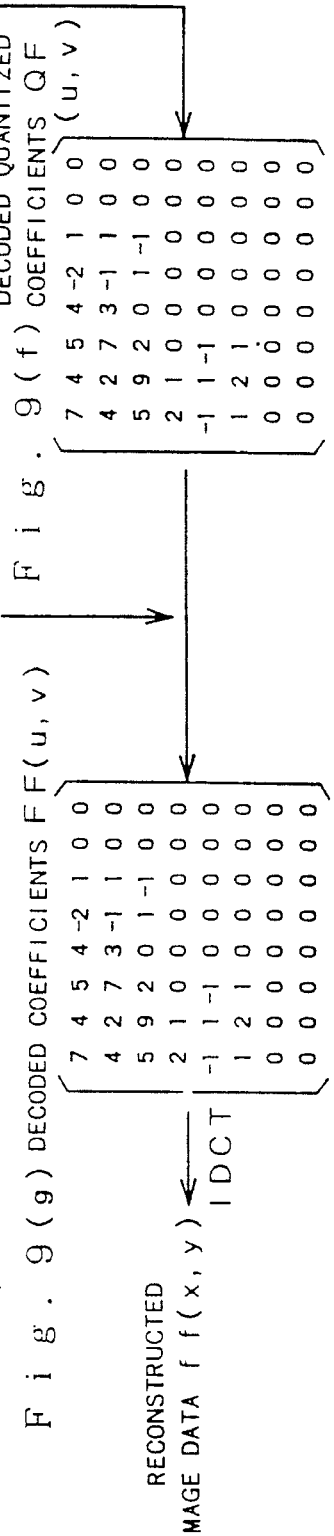

$\Delta DC = DC_i - DC_{i-1}$

Fig. 11

| CATEGORY SSSS | ΔDC/AC | ID BITS |
|---|---|---|
| 0 | 0 | 0 |
| 1 | -1,  1 | 1 |
| 2 | -3..-2,  2..3 | 2 |
| 3 | -7..-4,  4..7 | 3 |
| 4 | -15..-8,  8..15 | 4 |
| 5 | -31..-16,  16..31 | 5 |
| 6 | -63..-32,  32..63 | 6 |
| 7 | -127..-64,  64..127 | 7 |
| 8 | -255..-128,  128..255 | 8 |
| 9 | -511..-256,  256..511 | 9 |

Fig. 12

| CATEGORY SSSS | ΔDC HUFFMAN CODE WORD HF<sub>DC</sub> ||
| --- | --- | --- |
| | Y SIGNAL | U/V SIGNAL |
| 0 | 000 | 00 |
| 1 | 1110 | 01 |
| 2 | 001 | 10 |
| 3 | 010 | 110 |
| 4 | 011 | 1110 |
| 5 | 100 | 11110 |
| 6 | 101 | 111110 |
| 7 | 110 | 1111110 |
| 8 | 111100 | 11111110 |
| 9 | 1111010 | 11111111 |
| 10 | | |
| 11 | | |
| 12 | | |
| 13 | | |
| 14 | | |
| 15(NRL) | 1111011 | |
| 16(QC0) | 111110000 | |
| 17(QC1) | 111110001 | |
| 18(QC2) | 111110010 | |
| 19(QC3) | 111110011 | |
| 20(QC4) | 111110100 | |
| 21(QC5) | 111110101 | |
| 22(QC6) | 111110110 | |
| 23(QC7) | 111110111 | |
| 24(QC8) | 111111000 | |
| 25(QC9) | 111111001 | |
| 26(QC10) | 111111010 | |
| 27(QC11) | 111111011 | |
| 28(QC12) | 111111100 | |
| 29(QC13) | 111111101 | |
| 30(QC14) | 111111110 | |
| 31(QC15) | 111111111 | |

JIG-ZAG SCANNING

Fig. 15

AC COEFFICIENT
HUFFMAN CODE TABLE

|  |  | CATEGORY SSSS | |
|---|---|---|---|
|  |  | 0 | 1 - - - - - - - - - 9 |
| ZERO-RUN LENGTH NNNN | 0 | EOB | AC COEFFICIENT HUFFMAN CODE WORDS HF AC |
|  | 1 | ZRL | |
|  | 2 | — | |
|  | 15 | — | |

Fig. 16

| NNNN / SSSS | AC COEFFICIENT HUFFMAN CODE WORD HF$_{AC}$ | |
|---|---|---|
|  | Y SIGNAL | U/V SIGNAL |
| 0/0 (EOB) | 11111 | 11111 |
| 0/1 | 00 | 00 |
| 0/2 | 01 | 01 |
| 0/3 | 100 | 1010 |
| 0/4 | 1010 | 11000 |
| 0/5 | 11000 | 1110010 |
| 0/6 | 110110 | 111100010000 |
| 0/7 | 111011100 | 111100010001 |
| 0/8 | 111100010000 | 111100010010 |
| 0/9 | 11101111000 | 11101111000 |
| 1/0 (ZRL) | 111101111111 | 111101111111 |
| 1/1 | 1011 | 100 |
| 1/2 | 11001 | 11001 |
| 1/3 | 1110100 | 1110011 |
| 1/4 | 111100010001 | 111100010011 |
| 1/5 | 111100010010 | 111100010100 |
| 1/6 | 111100010011 | 111100010101 |
| 1/7 | 111100010100 | 111100010110 |
| 1/8 | 111100010101 | 111100010111 |
| 1/9 | 11101111001 | 11101111001 |

Fig. 17A

DCT COEFFICIENTS F(u, v)

| | | | | | | | |
|---|---|---|---|---|---|---|---|
| 12 | 0 | 4 | 0 | 0 | 0 | 1 | 0 |
| -4 | 3 | 0 | -2 | 0 | 0 | 0 | 0 |
| 0 | 5 | 3 | 0 | 1 | 0 | 0 | 0 |
| -4 | 0 | 0 | 0 | 0 | 0 | 0 | 0 |
| 0 | 2 | 0 | 0 | 0 | 0 | 0 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

DCi → 12

Fig. 17B   DC COEFFICIENT CODING ($DC_{i-1}=0$)

$\Delta DC = 12 \rightarrow SSSS = 4 \rightarrow HF_{DC} + ID = \underline{011}\underline{1100}$
$\phantom{\Delta DC = 12 \rightarrow SSSS = 4 \rightarrow HF_{DC} + ID = 011110}\,HF_{DC}\ \ ID$ Fig. 17C   AC COEFFICIENT CODING

· JIG-ZAG SCAN  :  0, -4,  0, 3,  4,  0, 0, 5

· NNNN/SSSS =  1/3    1/2   0/3   2/3

· $HF_{AC} + ID$ = $\underline{1110100011}\ \underline{1100111}$
$\phantom{HF_{AC} + ID = 11101}HF_{AC}\ \ \ ID\ \ \ HF_{AC}\ ID$ Fig. 19 A         Fig. 19 B
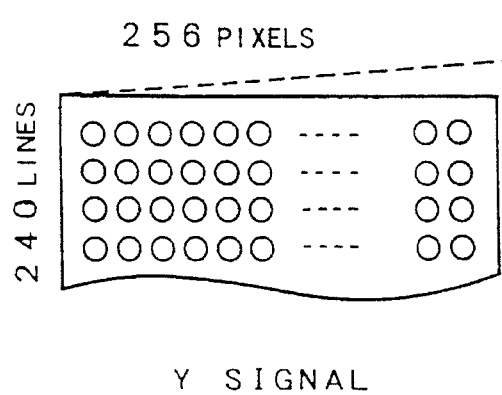
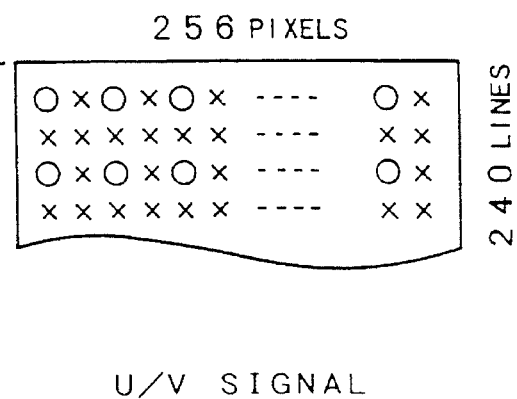
Fig. 19 C
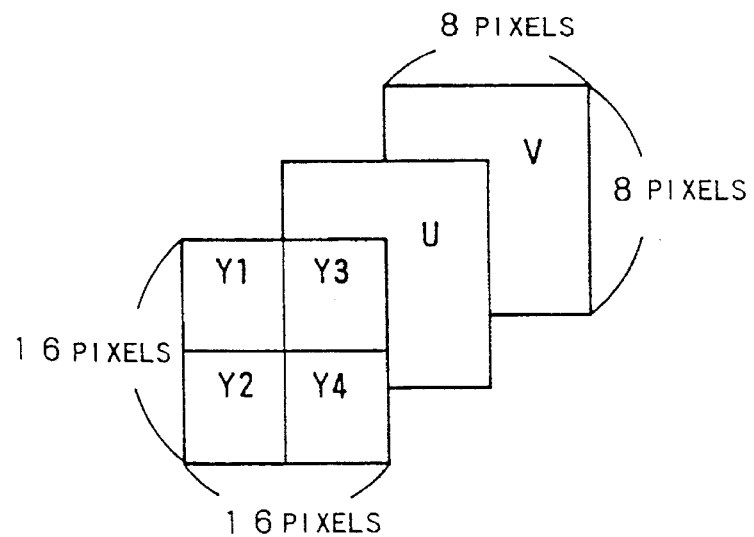

Fig. 21

| NNNN / SSSS | AC COEFFICIENT HUFFMAN CODE WORD HFac | |
|---|---|---|
| | Y SIGNAL | U/V SIGNAL |
| 0/1 | 00 | 00 |
| 1/1 | 1011 | 100 |
| 2/1 | 11010 | 1011 |
| 3/1 | 110111 | 11010 |
| 4/1 | 111000 | 11011 |
| 5/1 | 111001 | 111000 |
| 6/1 | 1110110 | 1110101 |
| 7/1 | 111011101 | 1110110 |
| 8/1 | 111100111111 | 111011101 |
| 9/1 | 111101000111 | 111101000111 |
| 10/1 | 111101001111 | 111101001111 |
| 11/1 | 111101010111 | 111101010111 |
| 12/1 | 111101011111 | 111101011111 |
| 13/1 | 111101100111 | 111101100111 |
| 14/1 | 111101101111 | 111101101111 |
| 15/1 | 111101110111 | 111101110111 |

WHEN APPLIED TO NULL RUN DATA:

$NNNN = \left[ \text{NUMBER OF BLOCKS} \right] - 1$ $SSSS = 1$

METHOD AND APPARATUS FOR COMPRESSING AND DECOMPRESSING IMAGE DATA USING TWO DIMENSIONAL ORTHOGONAL TRANSFORM WITH IMPROVED COMPRESSION RATE

This application is a Continuation of application Ser. No. 08/466,511, filed on Jun. 6, 1995, now abandoned which is a Continuation of U.S. Ser. No. 08/127,533 filed Sep. 28, 1993, now abandoned.

BACKGROUND OF THE INVENTION

1. Field of the Invention

The present invention relates to a method of an apparatus for compressing and decompressing image data.

2. Description of the Related Art

FIG. 31 is a block diagram showing a structure of conventional image data compression apparatus and a decompression apparatus. In a image data compression apparatus 540, original image data is orthogonally transformed with respect to every pixel block of M×N pixels, where M and N are integers, by an orthogonal transform unit 542, quantized by a quantization unit 544, and finally coded by an entropy coding unit 546 to produce compressed image data. In a image data decompression apparatus 550, the compressed image data is decoded by an entropy decoding unit 556, inversely quantized by an inverse quantization unit 554, and then inverse-transformed by an inverse orthogonal transform unit 552 to produce reconstructed image data. The quantization unit 544 and the inverse quantization unit 554 utilize an identical quantization table 562, and the entropy coding unit 546 and the entropy decoding unit 556 use an identical code table 564.

It sometimes happens that an image to be compressed includes a first image area which is to be reconstructed with a high image quality and a second image area which may be reconstructed with a lower image quality. In such a case, image data of the first image area is quantized with a quantization table having relatively low quantization levels while image data of the second image area is quantized with another quantization table having relatively high quantization levels. A quantization table is a matrix having the same size as a pixel block, that is, an M×N matrix. In the conventional image data compression/decompression apparatus, when a plurality of quantization tables are needed to one image, the plurality of quantization tables each consisting of an M×N matrix should be transferred from the compression apparatus 540 to the decompression apparatus 550. This undesirably increases the size of compressed video data.

Incidentally, when an image to be compressed includes a simple and monotonous image area consisting of a series of pixel blocks uniformly painted with a predetermined color, M×N matrices of orthogonal transform coefficients corresponding to the plurality of pixel blocks are all entropy coded according to the conventional apparatus. Compressed image data representing such a simple and monotonous image area therefore requires a relatively large data size.

SUMMARY OF THE INVENTION

An object of the present invention is thus to provide a novel technique for reducing the size of compressed video data.

The present invention is directed to a method of decompressing compressed image data including code data generated by successively executing orthogonal transform, quantization, and entropy coding on image data. The method comprises the steps of: (a) preparing compressed image data including code data for a plurality of pixel blocks in an image, a first coefficient code for a first pixel block, and a second coefficient code for an arbitrary second pixel block, where the first pixel block is at a front end of the plurality of pixel blocks; (b) executing entropy-decoding on the code data to generate quantized transform coefficients for the plurality of pixel blocks, and executing entropy-decoding on the first and second coefficient codes to generate first and second coefficients, respectively; (c) multiplying basic quantization levels of a basic quantization table by the first and second coefficients to generate first and second quantization tables, respectively; (d) inversely quantizing the quantized transform coefficients for the first and second pixel blocks with the first and second quantization tables, respectively, to thereby obtain inversely-quantized transform coefficients; and (e) executing inverse orthogonal transform on the inversely-quantized transform coefficients to obtain decompressed image data.

The first and the second quantization table having different quantization levels are created only by specifying the first and second coefficients. This effectively reduces the size of the compressed image data compared with a conventional method where two quantization tables are included in compressed image data.

In a preferred embodiment of the present invention, the code data include a plurality of data units correspond to the plurality of pixel blocks, where the plurality of data units are arranged in order of arrangement of the plurality of pixel blocks in the image, and the first and second coefficient codes are located right before first and second data units for the first and second pixel blocks, respectively, in the compressed image data.

Thus the first and second coefficients are readily related to the first and second pixel blocks.

Preferably, each of the first and second coefficient codes is an entropy code word within a code table including entropy code words for the first and second coefficients as well as a direct current component of the transform coefficients.

The first and second coefficients are uniquely and immediately decodable accordingly.

According to an aspect of the present invention, the step (d) comprises the step of: inversely quantizing with the first quantization table the quantized transform coefficients for a series of pixel blocks ranging from the first pixel block to a third pixel block arranged right before the second pixel block.

Since the first coefficient is applied to a series of pixel blocks until the second coefficient appears, it is not required that the first coefficient is included before each unit data for the plurality of pixel blocks. This structure effectively reduces the size of the compressed image data consequently.

According to another aspect of the present invention, the step (c) comprises the step of: making a quantization level of the first and second quantization tables equal to a predetermined maximum value when the quantization level obtained by the multiplication is no less than the predetermined maximum value.

Thus the number of bits to express the quantization levels is kept no more than the predetermined maximum value.

According to still another aspect of the present invention, the step (c) comprises the step of: keeping a value of a prescribed basic quantization level of the basic quantization table in determining quantization levels of the first and second quantization tables.

This efficiently reduces a quantization error due to inverse quantization of the predetermined component of the transform coefficients.

Preferably, the prescribed basic quantization level is for a direct current component of the transform coefficients.

This efficiently reduces a quantization error of the direct current component.

According to another aspect of the present invention, the compressed image data further includes identical-pattern block data indicating the number of pixel blocks in series having an identical image pattern, and the step (b) comprises the step of: generating the quantized transform coefficients for the pixel blocks represented by the identical-pattern block data by setting a specific component of the quantized transform coefficients to a predetermined value while setting all of the quantized transform coefficients other than the specific component to zero.

Consequently, a plurality of pixel blocks in series having an identical image pattern can be represented by relatively small data.

Preferably, the specific component is a direct current component.

The series of pixel blocks can be pained with a uniform color.

In a preferred embodiment of the present invention, the step (d) comprises the step of: omitting the inverse quantization on the transform coefficients decoded from the identical-pattern block data.

This effectively reduce a quantization error due to inverse quantization.

The present invention is also directed to a method comprising the steps of: (a) preparing compressed image data including code data for a plurality of first pixel blocks in an image, and identical-pattern block data indicating the number of second pixel blocks in series having an identical image pattern; (b) executing entropy-decoding on the code data to generate first quantized transform coefficients for the plurality of first pixel blocks, and generating second quantized transform coefficients for the second pixel blocks by setting a specific component of the second quantized transform coefficients to a predetermined value while setting all of the second quantized transform coefficients other than the specific component to zero; (c) inversely quantizing the first and second quantized transform coefficients with a quantization table, to thereby obtain first and second inversely-quantized transform coefficients; and (e) executing inverse orthogonal transform on the first and second inversely-quantized transform coefficients to obtain decompressed image data.

The present invention is further directed to an apparatus for decompressing compressed image data including code data generated by successively executing orthogonal transform, quantization, and entropy coding on image data. The apparatus comprises: a memory for storing compressed image data including code data for a plurality of pixel blocks in an image, a first coefficient code for a first pixel block, and a second coefficient code for an arbitrary second pixel block, where the first pixel block is at a front end of the plurality of pixel blocks; entropy-decoding means for executing entropy-decoding on the code data to generate quantized transform coefficients for the plurality of pixel blocks, and executing entropy-decoding on the first and second coefficient codes to generate first and second coefficients, respectively; inverse-quantization table generation means for multiplying basic quantization levels of a basic quantization table by the first and second coefficients to generate first and second quantization tables, respectively; inverse quantization means for inversely quantizing the quantized transform coefficients for the first and second pixel blocks with the first and second quantization tables, respectively, to thereby obtain inversely-quantized transform coefficients; and inverse orthogonal transform means for executing inverse orthogonal transform on the inversely-quantized transform coefficients to obtain decompressed image data.

The present invention is also directed to an apparatus comprising: a first memory for storing compressed image data including code data for a plurality of first pixel blocks in an image, and identical-pattern block data indicating the number of second pixel blocks in series having an identical image pattern; a second memory for storing a specified value for a prescribed component of transform coefficients for the plurality of second pixel blocks; entropy decoding means for executing entropy-decoding on the code data to generate first quantized transform coefficients for the plurality of first pixel blocks, and generating second quantized transform coefficients for the second pixel blocks by setting a specific component of the second quantized transform coefficients to the specified value stored in the second memory while setting all of the second quantized transform coefficients other than the specific component to zero; inverse quantization means for inversely quantizing the first and second quantized transform coefficients with a quantization table, to thereby obtain first and second inversely-quantized transform coefficients; and inverse orthogonal transform means for executing inverse orthogonal transform on the first and second inversely-quantized transform coefficients to obtain decompressed image data.

The present invention is further directed to a method of compressing image data, comprising the steps of: (a) executing orthogonal transform on image data with respect to each of a plurality of pixel blocks in an image to obtain transform coefficients for the plurality of pixel blocks; (b) specifying a first coefficient for a first pixel block, and a second coefficient for an arbitrary second pixel block, the first pixel block being at a front end of the plurality of pixel blocks; (c) multiplying basic quantization levels of a basic quantization table by the first and second coefficients to generate first and second quantization tables, respectively; (d) quantizing the transform coefficients for the first and second pixel blocks with the first and second quantization tables, respectively, to thereby obtain quantized transform coefficients; and (e) executing entropy-coding on the quantized transform coefficients to generate code data, and executing entropy-coding on the first and second coefficients to generate first and second coefficient codes, respectively; and (f) generating compressed image data including the code data, and the first and second coefficient codes.

The present invention is further directed to a method comprising the steps of: (a) preparing compressed image data including code data for a plurality of pixel blocks in an image, and a first coefficient code for an arbitrary first pixel block in the plurality of pixel blocks; (b) executing entropy-decoding on the code data to generate quantized transform coefficients for the plurality of pixel blocks, and executing entropy-decoding on the first coefficient code to generate a first coefficient; (c) multiplying predetermined basic quantization levels of a basic quantization table by the first coefficient to generate a first quantization table; (d) inversely quantizing the quantized transform coefficients for at least one pixel block including the first pixel block with the first quantization table, to thereby obtain inversely-quantized transform coefficients; and (e) executing inverse orthogonal transform on the inversely-quantized transform coefficients to obtain decompressed image data.

According to an aspect invention, the compressed image data further includes a second coefficient code for an arbitrary second pixel block arranged after the first pixel block in the image; and wherein the step (b) comprises the step of executing entropy-decoding on the second coefficient code to generate a second coefficient; the step (c) comprises the step of multiplying the basic quantization levels of the basic quantization table by the second coefficient to generate a second quantization table; the step (d) comprised the step of inversely quantizing with the first quantization table the quantized transform coefficients for a series of pixel blocks ranging from the first pixel block to a third pixel block arranged right before the second pixel block, and inversely quantizing the quantized transform coefficients for at least one pixel block including the second pixel block with the second quantization table.

These and other objects, features, aspects, and advantages of the present invention will become more apparent from the following detailed description of preferred embodiments with the accompanying drawings.

BRIEF DESCRIPTION OF THE DRAWINGS

FIGS. 6(a) through 6(g) show a basic operation of the image data compression unit and the image data decompression unit;

FIGS. 7(a) through 7(g) show an exemplified compression and decompression operation where the quantization level coefficient QCx is equal to four;

FIGS. 8(a) through 8(g) show another exemplified compression and decompression operation where a DC component is kept intact in quantization process;

FIGS. 9(a) through 9(g) show still another exemplified compression and decompression operation where the quantization level coefficient QCx is equal to zero;

FIG. 11 shows a categorizing table used in Huffman coding process;

FIG. 12 shows an example of a Huffman code table $HT_{DC}$ for DC coefficients;

FIG. 15 shows a two-dimensional Huffman code table $HT_{AC}$ for AC coefficients;

FIG. 16 shows exemplified contents of the Huffman code table $HT_{AC}$;

FIGS. 17A through 17C shows an example of Huffman coding process;

FIGS. 19A through 19C show a relationship among blocks for Y, U, and V signals;

FIG. 21 shows another part of the AC coefficient Huffman code table $HT_{AC}$, which is applied to null run data;

DESCRIPTION OF THE PREFERRED EMBODIMENT

The structure and function of preferred embodiments of the present invention will be described as follows:

A. Structure and Operation of Compression and Decompression Units;

B. Adjustment of Quantization Table QT with Quantization Level Coefficient QCx;

C. Huffman Coding and Structure of Compressed data

D. Structure of Inverse Quantization Table Generator;

E. Decoding of Null Run Data; and

F. Modifications.

A. Structure and Operation of Compression and Decompression Units

Figure 1:
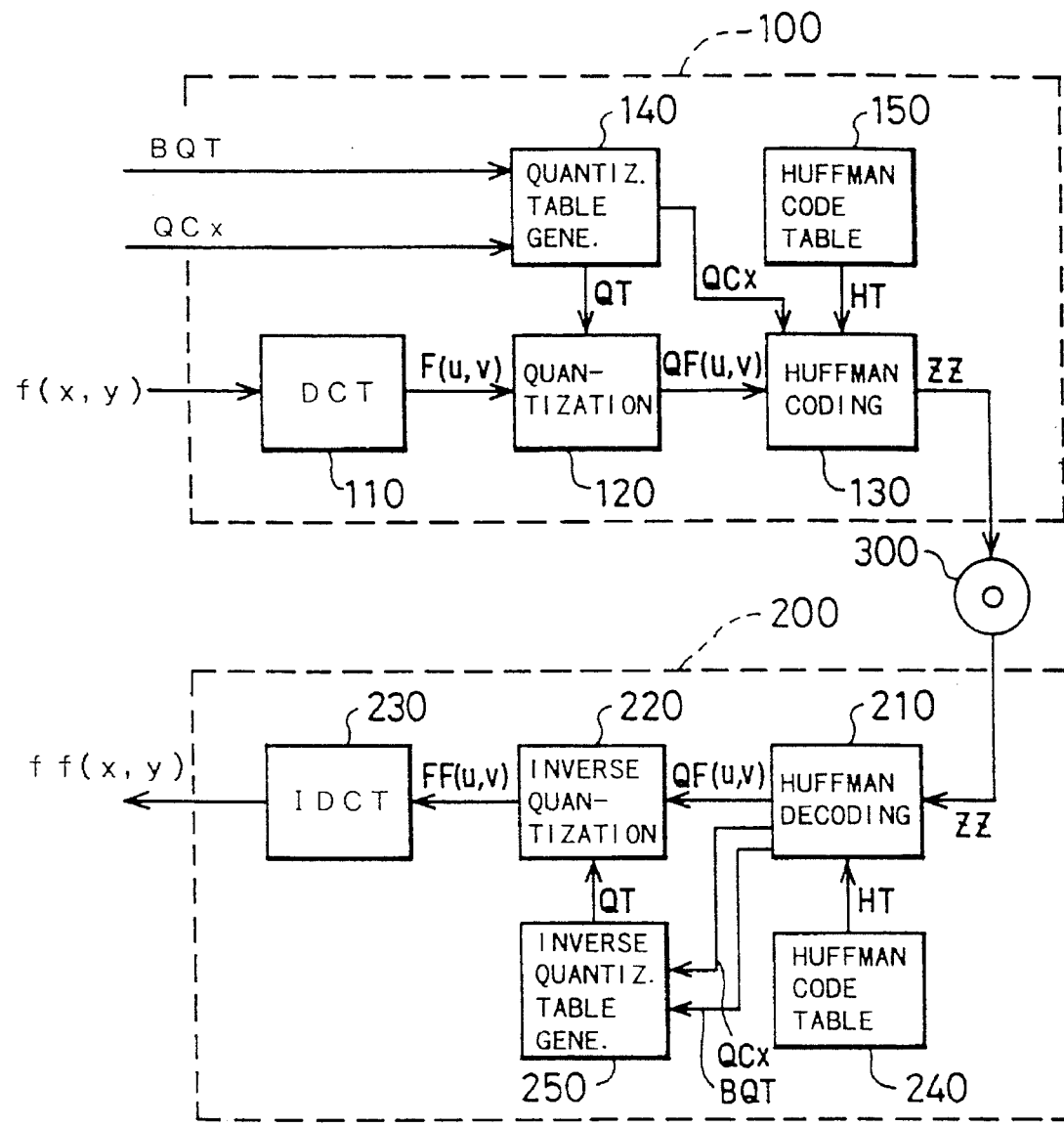
FIG. 1 is a block diagram showing the functional structure of a image data compression unit and a image data decompression unit embodying the present invention.

FIG. 1 is a block diagram showing the functional structure of a image data compression unit 100 and a image data decompression unit 200 embodying the present invention.

The image data compression unit 100 comprises a DCT (Discrete Cosine Transform) unit 110 for executing discrete cosine transform on original image data f(x,y), a quantization unit 120 for quantizing transform coefficients F(u,v) obtained through the discrete cosine transform, a Huffman coding unit 130 for executing Huffman coding on quantized transform coefficients QF(u,v) to generate compressed image data ZZ, a quantization table generator 140, and a Huffman code table memory 150. The quantization table generator 140 creates a quantization table QT based on a basic quantization table BQT and a quantization level coefficient QCx as described later. The compressed image data ZZ is stored in a memory medium such as a CD-ROM (compact disk read-only memory) and transferred from the image data compression unit 100 to the image data decompression unit 200.

The image data decompression unit 200 includes a Huffman decoding unit 210 for executing Huffman decoding on the compressed image data ZZ, an inverse quantization unit 220 for inversely quantizing the quantized transform coefficients QF(u,v) decoded by the Huffman decoding unit 210, an IDCT (inverse discrete cosine transform) unit 230 for executing inverse discrete cosine transform on inversely quantized transform coefficients FF(u,v) to generate decompressed image data ff(x,y), a Huffman code table memory 240, and an inverse quantization table generator 250. The inverse quantization table generator 250 receives from the Huffman decoding unit 210 a basic quantization table BQT and a quantization level coefficient QCx decoded from the compressed image data ZZ, and creates a quantization table QT based thereon. The quantization table QT used in the image data decompression unit 200 is the same as that used in the image data compression unit 100. An identical Huffman code table HT is stored both in the Huffman code table memory 240 of the decompression unit 200 and the Huffman code table memory 150 of the compression unit 100.

Figure 2:
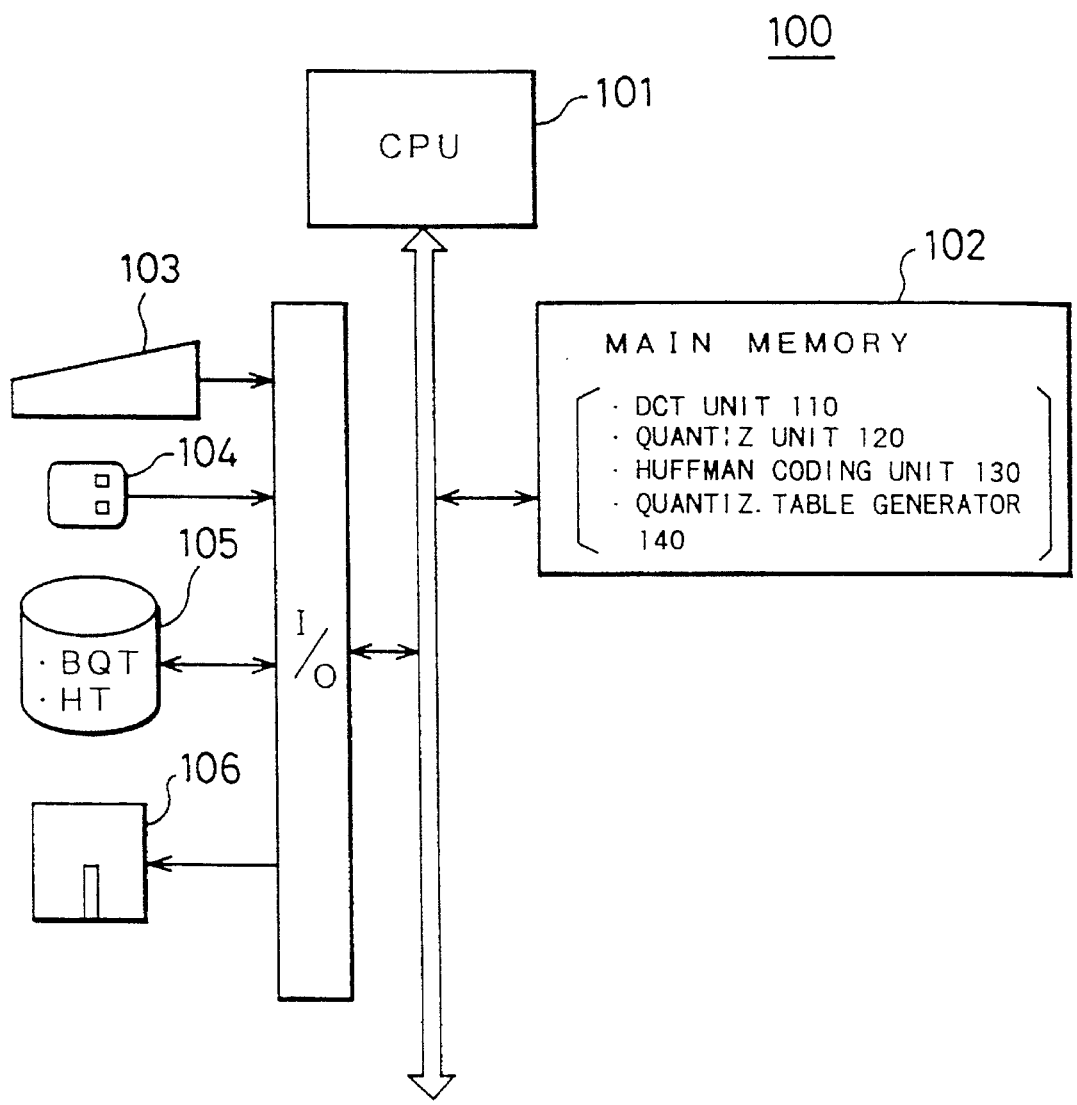
FIG. 2 is a block diagram showing a concrete structure of the image data compression unit.

FIG. 2 is a block diagram showing a concrete structure of the image data compression unit 100, which includes a CPU (central processing unit) 101, a main memoir 102, a keyboard 103, a mouse 104, a magnetic disk unit 105, and a magneto-optical disk unit 106. The units 110 through 140 of the compression unit 100 shown in FIG. 1 are implemented by software programs stored in the main memory 102. The basic quantization table BQT and the Huffman code table HT are stored in the magnetic disk unit 105. The compression unit 100 constitutes a work station for creating video games, where the CPU 101 executes the software programs to perform image data compression as well as a variety of programs to create video games. Each video game program thus created is stored with compressed image data in the magneto-optical disk unit 106. The magneto-optical disk unit 106 is then used to manufacture a CD-ROM including a video game program and the compressed image data.

Figure 3:
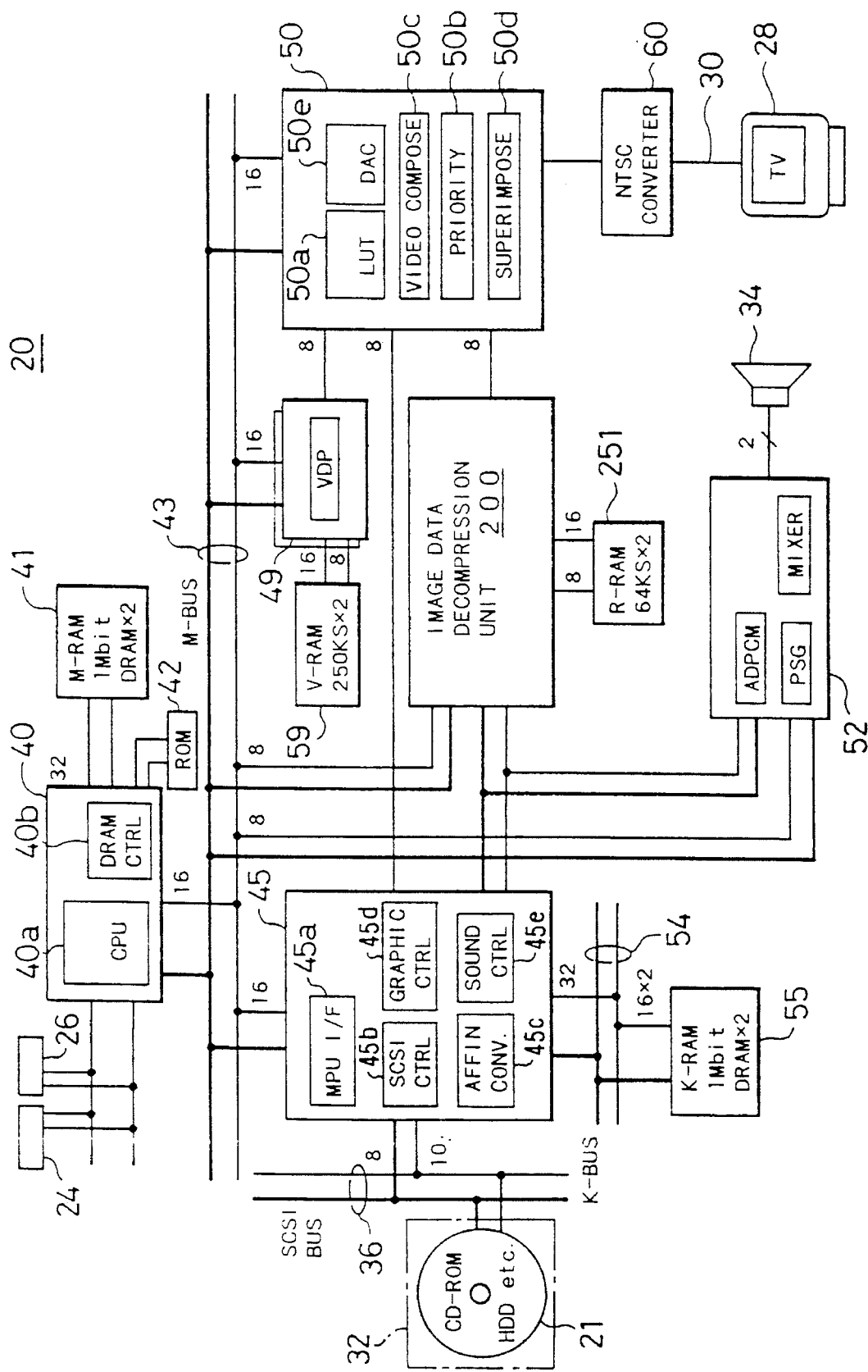
FIG. 3 is a block diagram showing a concrete structure of the image data decompression unit.

FIG. 3 is a block diagram showing a typical structure of a video game machine 20 including the image data decompression unit 200. The video game machine 20 comprises a CD-ROM drive 32 connected to a bus 36 (SCSI-BUS), a micro-processor unit 40 (MPU) for executing image processing and other related processing, a main memory 41 (M-RAM) directly connected to the MPU 40, and a ROM 42 directly connected to the MPU 40 for storing a BIOS (basic input output systems) program. The video game machine 20 further comprises a variety of units connected to an bus 43 (M-BUS) of the MPU 40; that is, a video signal control unit 45, the image data decompression unit 200, a VDP (video-disk player) unit 49 for outputting video signals, a video encoder unit 50 for composing video signals and outputting the composed video signals, and an audio data output unit 52 for outputting audio data.

The video game machine 20 also includes a memory 55 (K-RAM) connected to a local bus 54 (K-BUS) of the video signal control unit 45, another memory 251 (R-RAM) connected to a local bus of the image data decompression unit 200, a video memory 59 (V-RAM) connected to a local bus of the VDP unit 49, an NTSC (National Television System Committee) converter 60 for converting output signals from the video encoder unit 50 to NTSC signals and outputting the NTSC signals to a color television 28.

Each of the video signal control unit 45, the image data decompression unit 200, the video encoder unit 50, and the audio data output unit 52 is composed of a logic circuit.

Figure 4A:
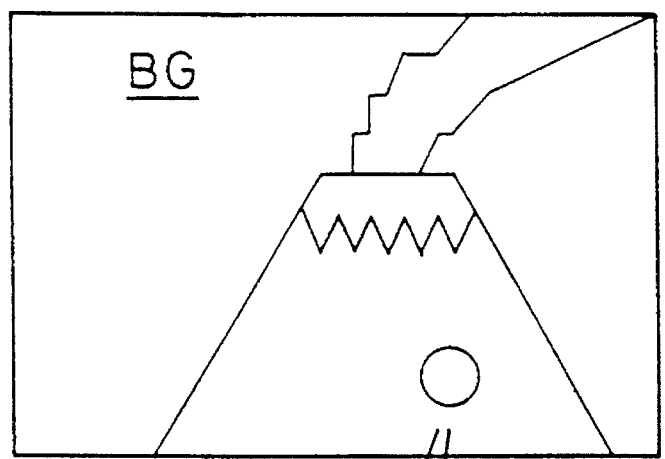
FIG. 4A is a plan view illustrating an exemplified original image.
Figure 4B:
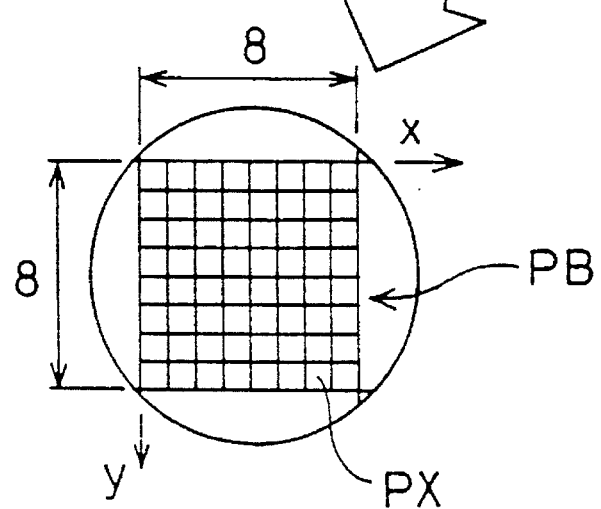
FIG. 4B is an enlarged view illustrating part of the original image.

FIG. 4A is a plan view illustrating an example of an original image constituting a background image of a video game. The original image includes a natural image representing a volcano and a background BG uniformly painted with a certain color. FIG. 4B is an enlarged view showing part of the original image including a pixel block PB. The pixel block PB consists of M×N pixels PX, where M and N are integers. The integers M and N are preferably set equal to eight or sixteen, and they are both eight in this example. The integers M and N, however, can have a same value or different values. As described later, a data segment of the compressed image data ZZ representing the background BG has a specific data form called "null run data", which indicates the number of pixel blocks PB in series filled with an identical color.

The DCT unit 110 of the compression unit 100 executes two-dimensional discrete cosine transform on original image data with respect to each pixel block PB according to the following Equation (1):

$$F(u,v) = \frac{1}{4} C(u)C(v) \sum_{x=0}^{7} \sum_{y=0}^{7} f(x,y) \cos \frac{\pi(2x+1)u}{16} \cos \frac{\pi(2y+1)v}{16} \quad (1)$$

where:

$$C(u), C(v) = \frac{1}{\sqrt{2}}, \quad u,v = 0$$
$$= 1, \quad u,v \neq 0$$

where f(x,y) denotes an 8×8 matrix of image data included in one pixel block PB, (x,y) denotes coordinates of each pixel in each pixel block PB, F(u,v) denotes a 8×8 matrix of discrete cosine transform coefficients, and (u,v) denotes spatial frequency coordinates.

Figure 5:
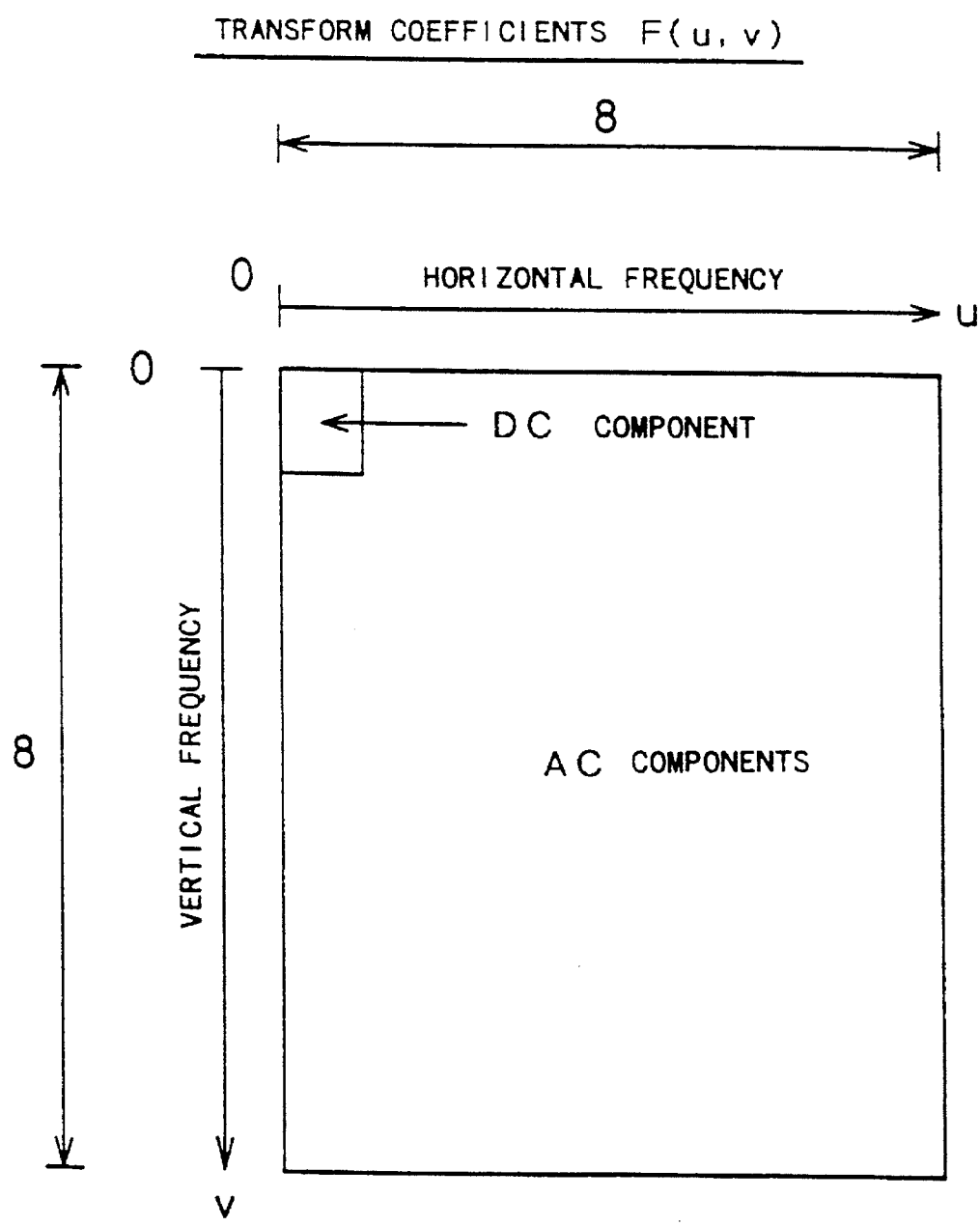
FIG. 5 shows an array of DCT coefficients F(u,v)

FIG. 5 shows a matrix of transform coefficients F(u,v). The transform coefficients F(u,v) has an 8×8 array as the pixel block PB. A transform coefficient F(0,0) at a left-upper end of the matrix is called a Direct Current component or a DC coefficient, while the other transform coefficients are called Alternate Current components or AC coefficients. The DC component represents a mean value of image data in a pixel block PB whereas the AC components indicate variation of the image data in a pixel block PB. Since there is a certain relation among the image data of adjacent pixels, low-frequency components of the AC coefficients have relatively large values and high-frequency components have relative small values. The high-frequency components have relatively small effects on image quality.

FIGS. 6(a) through 6(g) show a basic operation of the image data compression unit 100 and the image data decompression unit 200. The DCT unit 110 generates transform coefficients F(u,v) shown in FIG. 6(a).

The quantization table generator 140 creates a quantization table QT shown in FIG. 6(d) by multiplying quantization levels BQT(u,v) in a basic quantization table BQT shown in FIG. 6(c) by a quantization level coefficient QCx as follows:

$$QT(u,v) = QCx \times BQT(u,v) \quad (2)$$

In the example of FIGS. 6(a) through 6(g), the quantization level coefficient QCx is set equal to one, and the quantization table QT is thereby the same as the basic quantization table BQT.

The quantization unit 120 produces a quantized transform coefficients QF(u,v) shown in FIG. 6(b) through linear quantization of the transform coefficients F(u,v) with the quantization table QT. The linear quantization includes division of each transform coefficient by a corresponding quantization level and approximation of the quotient to a whole number.

The Huffman coding unit 130 generates compressed image data ZZ shown in FIG. 6(e) by executing Huffman coding on the quantized transform coefficients QF(u,v). Details of Huffman coding will be described later. The compressed image data ZZ includes a first data representing the basic quantization table BQT, and a second data representing the quantization level coefficient QCx and the quantized transform coefficients QF(u,v) as described below.

When the compressed image data ZZ is supplied to the image data decompression unit 200 shown in FIG. 1, the Huffman decoding unit 210 decodes the compressed image data ZZ to produce quantized transform coefficients QF(u,v) shown in FIG. 6(f). Since Huffman coding is a reversible coding process, the quantized transform coefficients QF(u,v) obtained by the Huffman decoding unit 210 is identical with the quantized transform coefficients QF(u,v) of FIG. 6(b) before the Huffman coding in the image data compression unit 100. The Huffman decoding unit 210 decodes the whole compressed image data ZZ to obtain the basic quantization table BQT of FIG. 6(c) and the quantization level coefficient QCx as well as the quantized transform coefficients QF(u,v), and supplies BQT and QCx to the inverse quantization table generator 250.

The inverse quantization table generator 250 creates the quantization table QT shown in FIG. 6(d) by multiplying the quantization levels of the basic quantization table BQT by the quantization level coefficient QCx. The inverse quantization unit 220 multiplies the quantization levels of the quantization table QT by the quantized transform coefficients QF(u,v) to obtain decoded transform coefficients FF(u,v) shown in FIG. 6(g).

The IDCT unit 230 generates reconstructed image data ff(x,y) by executing two-dimensional inverse discrete cosine transform (IDCT) on the decoded transform coefficients FF(u,v) as follows:

$$ff(x,y) = \frac{1}{4} C(u)C(v) \sum_{u=0}^{7} \sum_{v=0}^{7} FF(u,v) \cos\frac{\pi(2x+1)u}{16} \cos\frac{\pi(2y+1)v}{16} \quad (3)$$

where:

$$C(u), C(v) = \frac{1}{\sqrt{2}}, \quad u,v = 0$$
$$= 1, \quad u,v \neq 0$$

B. Adjustment of Quantization Table QT with Quantization Level Coefficient QCx

Since the quantization table QT is created according to the Equation (2), a greater quantization level coefficient QCx makes greater quantization levels in the quantization table QT. The operator can select a value of the quantization level coefficient QCx out of a plurality of predetermined values, 0 through 15 for example, before image data is compressed in the image data compression unit 100.

FIGS. 7(a) through 7(g) show an example of compression and decompression operation where the quantization level coefficient QCx is set equal to four. The quantization table generator 140 creates a quantization table QT shown in FIG. 7(d) according to the Equation (2). In this example, the maximum quantization level is limited to 15, and all the quantization levels more than 15 are forcibly set equal to 15.

The quantization unit 120 executes linear quantization of transform coefficients F(u,v) shown in FIG. 7(a) with the quantization table QT shown in FIG. 7(d) to obtain quantized transform coefficients QF(u,v) shown in FIG. 7(b), where a DC component is equal to one and all AC components are equal to zero. The greater quantization level coefficient QCx increases the number of coefficients QF(u,v) having a value of zero, thus increasing a compression ratio. In this example, decoded transform coefficients FF(u,v) shown in FIG. 7(g) are quite different from the original transform coefficients F(u,v) shown in FIG. 7(a), and a image quality of the reconstructed image is significantly lower than that obtained by the process of FIGS. 6(a) through 6(g) where the quantization level coefficient QCx is equal to one.

The DC component of the transform coefficients F(u,v) represents a mean value of image data in a pixel block PB as mentioned above, and significantly affects the image quality. It is thus preferable to keep a quantization level for the DC component of the transform coefficients F(u,v) equal to the value in the basic quantization table BQT irrespective of the quantization level coefficient QCx. FIGS. 8(a) through 8(g) show compression and decompression operation where the DC component is unchanged in quantization process, that is, a quantization level QT(0,0) for the DC component is forcibly set equal to one. When QT(0,0) is equal to one, a DC component of the decoded transform coefficients FF(u,v) shown in FIG. 8(g) is kept equal to that of the original transform coefficients F(u,v) shown in FIG. 8(a). This results in relatively small deterioration of the image quality while attaining a high compression ratio close to that according to the process of FIGS. 7(a) through 7(g). The quantization level QT(0,0) for the DC component may not be equal to one, and it can be set to any other desired value.

The quantization level coefficient QCx can be set equal to zero. When QCx is equal to zero, all the quantization levels in a quantization table QT are set equal to one as shown in FIGS. 9(c) and 9(d). In this case, quantized transform coefficients QF(u,v) shown in FIG. 9(b) is identical with original transform coefficients F(u,v) shown in FIG. 9(a). This results in image compression with high image quality under a relatively small compression ratio.

The quantization table generator 140 and the inverse quantization table generator 250 have the following features, which are shown in FIGS. 6(a) through 9(g):

(1) The quantization table QT is created by multiplying the quantization levels of the basic quantization table BQT by the quantization level coefficient QCx according to the Equation (2).

(2) If the result of multiplication becomes at least a predetermined maximum value (=15, in the example), the quantization level is forcibly set equal to the maximum value (see FIGS. 6(a) through 8(g)).

(3) The quantization level QT(0,0) for the DC component of the transform coefficients F(u,v) is kept equal to a corresponding value in the basic quantization table BQT irrespective of the quantization level coefficient QCx (see FIG. 8(c) and 8(d)).

(4) If the quantization level coefficient QCx is set equal to zero, all the quantization levels are set equal to one (see FIG. 9(d)).

The above features in generating the quantization table QT are implemented by a software program in the image data compression unit 100, and by the inverse quantization table generator 250 constructed with dedicated hardware circuitry in the image data decompression unit 200. The structure of the inverse quantization table generator 250 will be described later in detail.

Incidentally, the quantization level coefficient QCx can be allocated to each pixel block PB with the keyboard 103 and the mouse 104 before the original image data is compressed in the image data compression unit 100.

C. Huffman Coding and Structure of Compressed data

Figure 10A:
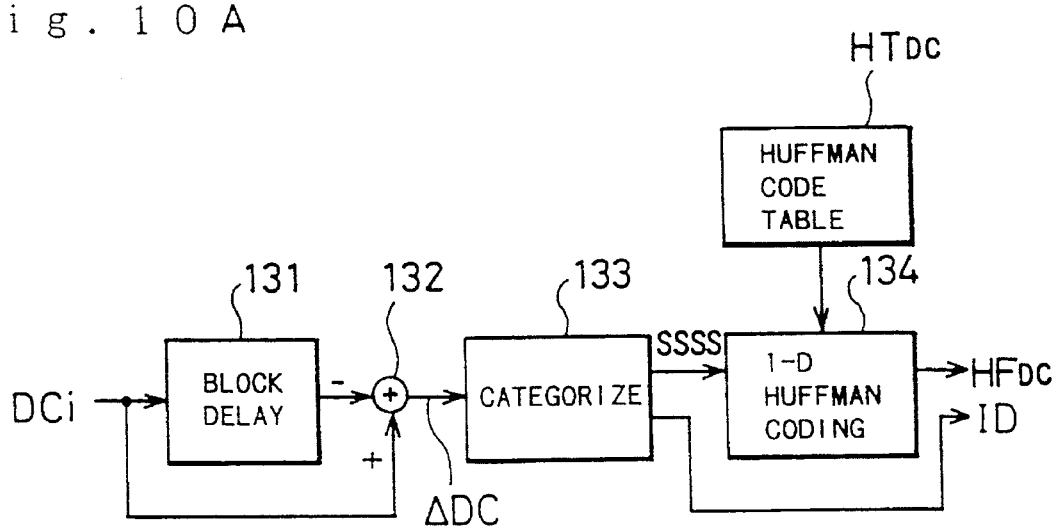
FIG. 10A is a block diagram showing the functional structure of a DC coefficient coding unit in a Huffman coding unit of the image data compression unit.
Figure 10B:
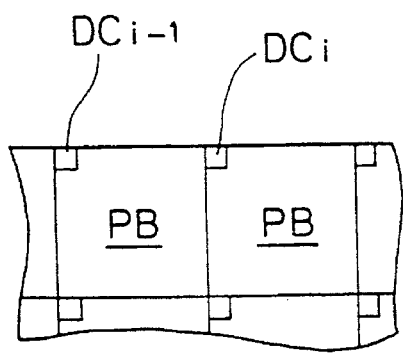
FIG. 10B shows determination of a difference ΔDC between DC coefficients of two adjacent pixel blocks.

The Huffman coding unit 130 of the image data compression unit 100 (FIG. 1) has a DC coefficient coding unit and an AC coefficient coding unit. FIG. 10A is a block diagram showing the functional structure of the DC coefficient coding unit. In the DC coefficient coding unit, a block delaying unit 131 and an adder 132 determines a difference $\Delta DC$ between a DC coefficient DCi of a pixel block PB and a DC coefficient DCi-1 for its preceding pixel block PB as shown in FIG. 10B.

A categorizing process unit 133 determines a category SSSS and identification data ID of the difference $\Delta DC$ according to a categorizing table shown in FIG. 11. The category SSSS is a numeral representing a range of the difference $\Delta DC$. The identification data ID is an ordinal number of the difference $\Delta DC$ in the range specified by the category SSSS.

The category SSSS is converted to a DC coefficient Huffman code word $HF_{DC}$ by a one-dimensional Huffman coding unit 134 shown in FIG. 10A. FIG. 12 shows an example of a Huffman code table $HT_{DC}$ used in the one-dimensional Huffman coding unit 134. The Huffman code table includes a first table for Y signal, and a second table for U and V signals, where Y signal is a luminance signal, and U and V signals are color difference signals. In this embodiment, an original image is represented by YUV signals, each of which is treated as the original image data f(x,y) in compression and decompression. The DC coefficient Huffman code table for U and V signals includes code words corresponding to categories SSSS=0 through 9. The DC coefficient Huffman code table for Y signals, on the other hand, includes code words corresponding to categories SSSS=15 through 31 as well as those corresponding to SSSS=0 through 9. A Huffman code word for SSSS=15 represents null run data. The null run data represents the number of pixel blocks PB in series having a uniform color. Huffman code words for categories SSSS=16 through 31 represent values of the quantization level coefficient QCx ranging from 0 to 15, respectively. For example, a Huffman code word '111110000' for a category SSSS=16 represents QCx=0, and another Huffman code word '111111111' for a category SSSS=31 represents QCx=15. The Huffman code words shown in FIG. 12 are uniquely and immediately decodable for all the categories SSSS=1 through 9 and 15 through 31.

Figure 13:
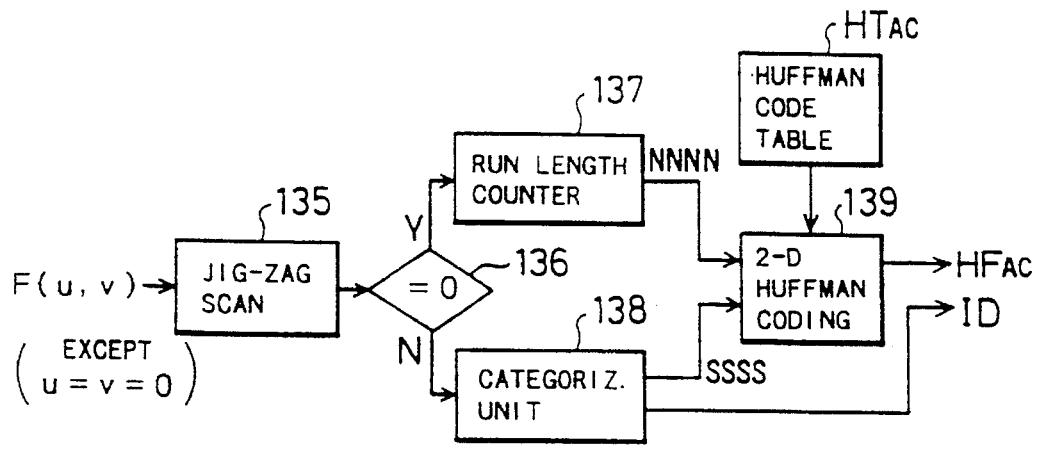
FIG. 13 is a block diagram showing the functional structure of an AC coefficient coding unit in the Huffman coding unit.
Figure 14:
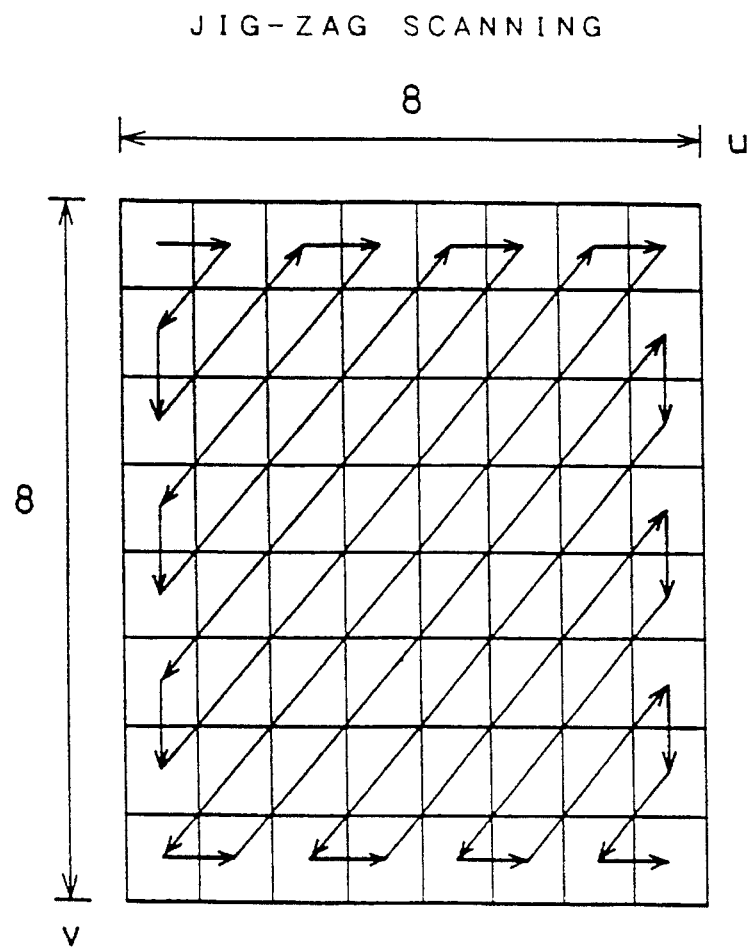
FIG. 14 shows a jig-zag scanning process for AC coefficients.

FIG. 13 is a block diagram showing the functional structure of the AC coefficient coding unit of the Huffman coding unit 130. The matrix of AC coefficients F(u,v) except F(0,0) is rearranged to a one-dimensional array by a jig-zag scanning unit 135. FIG. 14 shows a process of jig-zag scanning.

A judging unit 136 shown in FIG. 13 judging whether each AC coefficient in the one-dimensionally array is equal to zero or not. When the AC coefficient is equal to zero, a run length counter 137 converts the number of zeros in the AC coefficient array to a zero-run length NNNN. When the AC coefficient is not equal to zero, on the contrary, a categorizing unit 138 converts the value of the AC coefficient to a category SSSS and identification data ID by referring to the categorizing table shown in FIG. 11.

Each pair of a zero-run length NNNN and a category SSSS is converted to an AC coefficient Huffman code word $HF_{AC}$ by a two-dimensional Huffman coding unit 139. FIG. 15 shows the structure of a two-dimensional Huffman code table $HT_{AC}$ for AC coefficients. FIG. 16 shows an example of Huffman code words for the zero-run lengths NNNN=0 and NNNN=1 corresponding to two upper-most rows in the Huffman code table $HT_{AC}$ of FIG. 15. A Huffman code word '11111' for NNNN/SSSS=0/0 represents completion of code data for one pixel block.

FIGS. 17A through 17C show an example of Huffman coding process. FIG. 17B shows a process of coding a DC component F(0,0) of the transform coefficients F(u,v) shown in FIG. 17A. Suppose that the value of the DC coefficient for a preceding pixel block is zero, the difference $\Delta DC=F(0,0)$ is equal to 12. According to the categorizing table of FIG. 11, the category SSSS for $\Delta DC=12$ is four while the identification data ID is equal to '1100'. According to the DC coefficient Huffman code table $HT_{DC}$ for Y signal shown in FIG. 12, the Huffman code word $HF_{DC}$ for the category SSSS=4 is equal to '011'. A Huffman code ($HF_{DC}$+ID) for the DC coefficient is thus equal to '0111100' as shown in FIG. 17B.

FIG. 17C shows a process of coding AC components of the transform coefficients F(u,v) shown in FIG. 17A. The AC coefficients are rearranged to a one-dimensional array through the jig-zag scanning process, and then zero-valued AC coefficients are converted to zero-run lengths NNNN and non-zero AC coefficients to categories SSSS (FIG. 11). Each pair of a zero-run length NNNN and a category SSSS is converted to a Huffman code word $HF_{AC}$ according to the AC coefficient Huffman code table $HT_{AC}$ shown in FIGS. 15 and 16, and combined with identification data ID for the non-zero AC coefficient to constitute a Huffman code ($HF_{AC}$+ID) shown in FIG. 17C.

Figure 18:
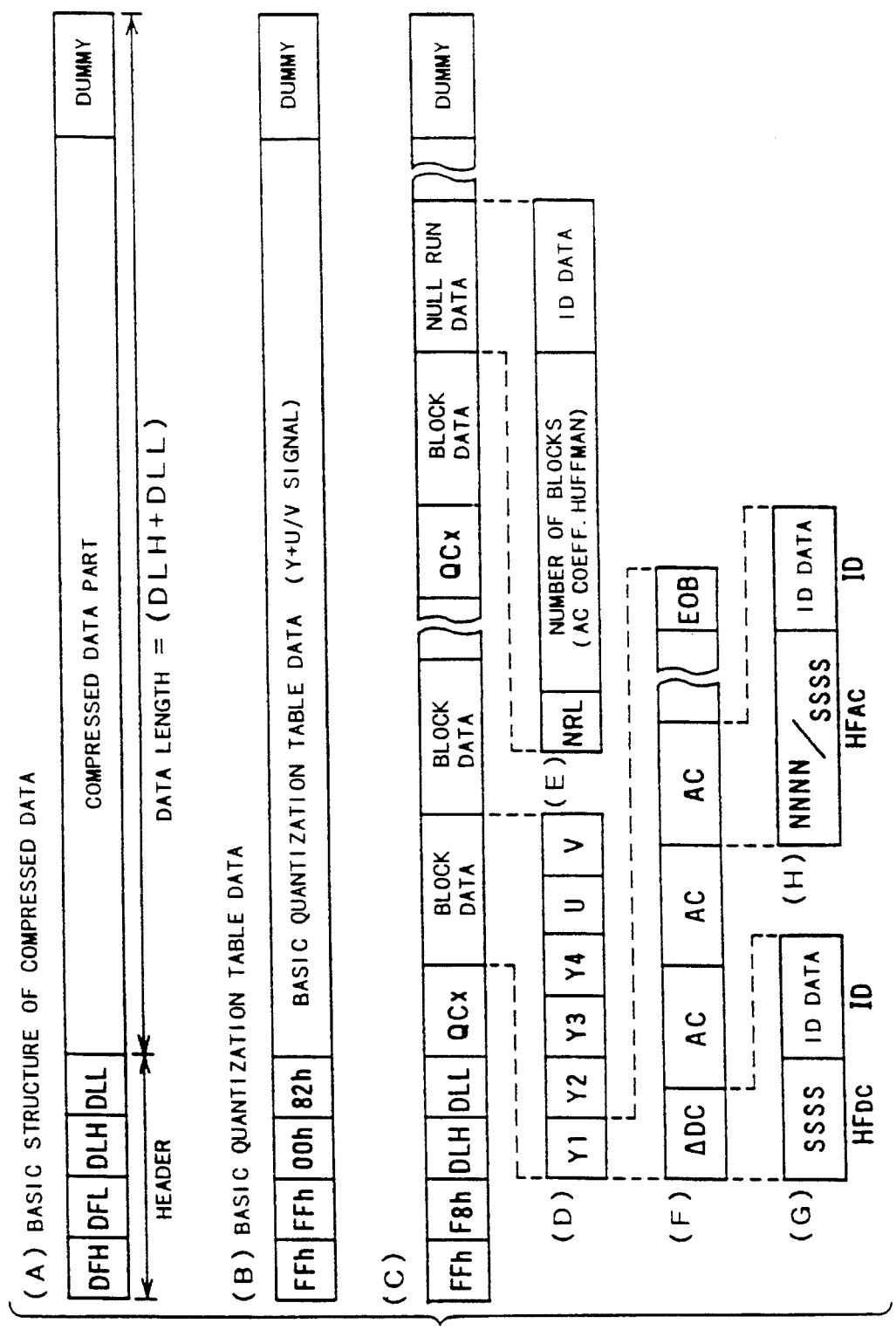
FIGS. 18A through 18H show the structures of compressed data.

FIGS. 18A through 18H show the structures of compressed data. Each type of the compressed data includes a header part, a compressed data part, and a dummy part as shown in FIG. 18A. The header part consists of four 1-byte data, DFH, DFL, DLH, and DLL. The first two data DFH and DFL identifies a data type included in the compressed data part: for example, data of the basic quantization table BQT, compressed image data of a full-color natural image, and compressed image data in the form of run length data. The latter 16-bit data in the header part DLH+DLL shows a total data length of the compressed data part and the dummy part. The compressed data part is variable length data because it is constituted by Huffman codes. The total data length of the compressed data part and the dummy part is thereby adjusted to an integral multiple of a 2-byte word.

FIG. 18B shows the structure of the compressed data representing the basic quantization table BQT. One set of this compressed data includes a first data part representing a basic quantization table BQT for Y signal and a second data part representing a basic quantization table BQT for U and V signals. The basic quantization table BQT is not necessarily expressed by Huffman codes because its data size is relatively small compared with the compressed data representing a color image.

FIG. 18C shows the structure of the compressed data representing a full-color natural image. The compressed data part includes code data representing the quantization level coefficient QCx, which includes code words for the categories SSSS=16 through 31 in FIG. 12, block data representing each pixel block, and null run data indicating the number of pixel blocks in series having a uniform color.

As shown in FIG. 18D, one unit of block data consists of four sets of Y-signal data, one set of U-signal data, and one set of V-signal data. FIGS. 19A through 19C show a relationship between blocks of Y, U, and V signals. As shown in FIG. 19A, one screen in this embodiment has a size of 256 pixels times 240 scanning lines. Discrete cosine transform is executed with respect to every pixel block of 8×8 pixels without pixel skipping for Y signals. As for U and V signals, on the other hand, discrete cosine transform is executed with respect to each pixel block of 8×8 pixels after ½ pixel skipping or sub-sampling in a horizontal direction and in a vertical direction as shown in FIG. 19B. An area of four Y-signal pixel blocks Y1 through Y4 corresponds to an area of one U-signal pixel block and to an area of one V-signal pixel block as shown in FIG. 19C, accordingly. The reason why the U and V signals are skipped while Y signal is not is because human eyes are relatively sensitive to the change of luminance represented by the change of Y signal whereas they are relatively insensitive to the change of color represented by the change of U and V signals. Skipping of only U and V signals allows to increase the compression ratio while preventing deterioration of image quality. One unit of block data shown in FIG. 18D is constituted by Huffman code data for all the areas shown in FIG. 19C.

As shown in FIG. 18F, each code data for one pixel block includes one DC coefficient Huffman code ΔDC and a plurality of AC coefficient Huffman codes. The DC coefficient Huffman code shown in FIG. 18G includes a Huffman code word $HF_{DC}$ representing a category SSSS and identification data ID as described before. Each AC coefficient Huffman code shown in FIG. 18H includes a Huffman code word $HF_{AC}$ representing a combination of a zero-run length NNNN and a category SSSS, and identification data ID.

As shown in FIG. 18C, the code data representing the quantization level coefficients QCx are inserted at the front end of the compressed data part, and right before a certain unit of block data corresponding to the pixel block to which a new value of the quantization level coefficient QCx is specified. The first value of the quantization level coefficient QCx, which is disposed at the front end of the compressed data part, is applied to at least one pixel block ranging from the first pixel block to the pixel block right before the one to which the second value of the quantization level coefficient QCx is specified. In a similar manner, the second value of the quantization level coefficient QCx is applied to at least one pixel block in series before the third value of the quantization level coefficient QCx is specified.

The first value of the quantization level coefficient QCx is not necessarily inserted at the front end of the compressed data part. If the first value is not inserted at the front end, the first value of the coefficient QCx is set equal to one in decompression process. Insertion of only one quantization level coefficient QCx in the middle of the compressed data part is therefore equivalent to specification of two quantization level coefficients QCx.

Since a Huffman code representing a newly specified quantization level coefficient QCx is inserted between block data units, the new quantization level coefficient QCx is readily applied to the block data unit right after the new coefficient QCx. Code data of the quantization level coefficient QCx is expressed by a DC coefficient Huffman code word $HF_{DC}$ as shown in FIG. 12. This allows immediate decoding of the code data placed at the front end of each block data unit, that is, whether the code data represents DC coefficient Huffman code of the pixel block Y1 or the quantization level coefficient QCx.

Null run data included in the compressed data part includes a DC coefficient code word of 'NRL', which indicates that the data unit is null run data, and identification data ID as shown in FIG. 18E.

Figure 20A:
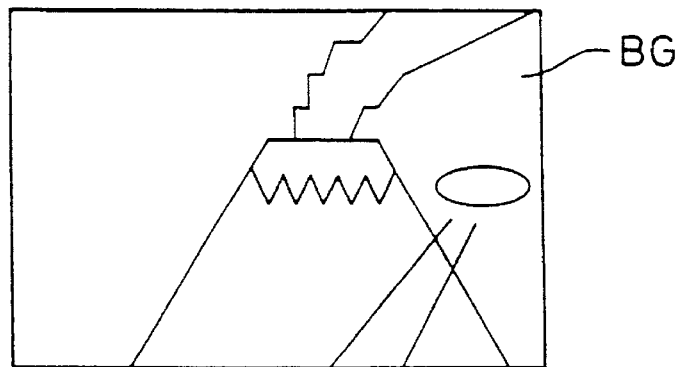
FIGS. 20A through 20C show the structure of null run data and an image expressed by the null run data.
Figure 20B:
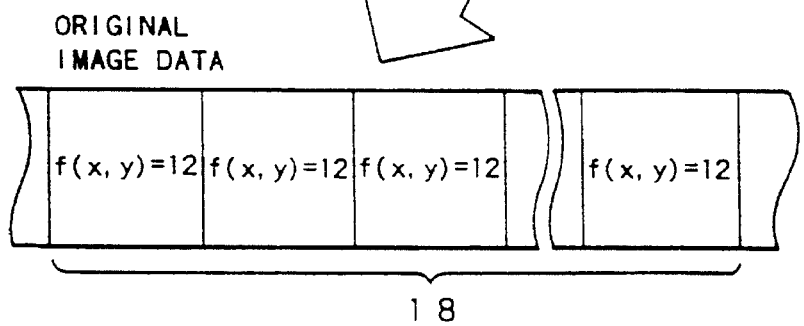
Figure 20C:
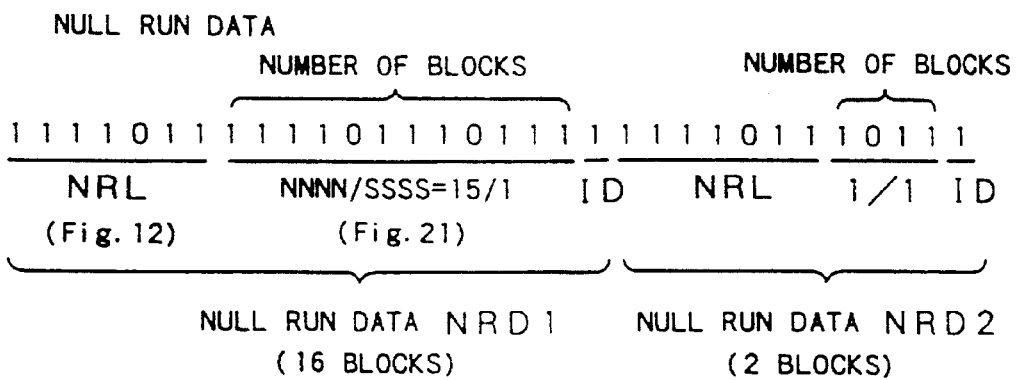

FIGS. 20A through 20C show an exemplified structure of null run data and an image expressed by the null run data. A background BG of an original image shown in FIG. 20A is uniformly painted with a predetermined color. An elliptic portion shown in FIG. 20A includes a series of eighteen pixel blocks where all pixels have an identical value of image data f(x,y))=12 as shown in FIG. 20B. FIG. 20C shows null run data representing these pixel blocks. The null run data includes first null run data NRD1 representing 16 pixel blocks and second null run data NRD2 representing 2 pixel blocks.

Each of the first and second null run data NRD1 and NRD2 includes a DC coefficient code word 'NRL' indicating that each data unit is null run data at a beginning thereof: the code word 'NRL' is '1111011' as shown in FIG. 12. Since each block data unit has a DC coefficient Huffman code at its front end as shown in FIG. 18F, null run data, block data, and code data of the quantization level coefficient QCx are uniquely and immediately identified through decoding of a DC coefficient code word placed at the front end of each data unit.

As shown in FIG. 20C, the number of pixel blocks is expressed by an AC coefficient Huffman code word. FIG. 21 shows part of the AC coefficient Huffman code table $HT_{AC}$ of FIG. 15, which is applicable to null run data. When the Huffman code table $HT_{AC}$ is applied to null run data, the zero-run length NNNN is set equal to the number of pixel blocks minus one, and the AC coefficient is set equal to one so that Huffman code words for the null run data are in the category SSSS=1. As shown in FIG. 20C, a data segment representing the number of pixel blocks (NNNN/SSSS=15/1) in the first null run data NRD1 shows a series of 16 pixel blocks having a uniform color while data segment representing the number of pixel blocks (NNNN/SSSS=1/1) in the second null run data NRD2 represents a series of 2 pixel blocks having the uniform color.

Each of the first and second null run data NRD1 and NRD2 has identification data ID at a rear end thereof; the identification data ID is fixed equal to one in this example.

The null run data requires only about 20 bits to represent a series of pixel blocks having a uniform color. On the contrary, normal block data unit requires approximately 300 through 400 bits to show a set of blocks painted with a uniform color, where one set of blocks consist of four Y-signal pixel blocks, one U-signal pixel block, and one V-signal pixel block as shown in FIG. 19C. Even if there exist a plural sets of pixel blocks in series which are painted with a uniform color, each block data unit for each set of pixel blocks requires about 300 through 400 bits. Use of the null run data thus effectively reduces required bits of compressed data representing a series of pixel blocks having a uniform color.

The values of a luminance signal Y and color difference signals U and V for a series of pixel blocks having a uniform color expressed by the null run data are not included in the compressed data, but are specified in a software program defining a video game. When making a software program for a video game, the operator defines an area of pixel blocks having a uniform color (the background BG in the example of FIG. 20A) with the mouse 104, and specifies luminance and color tone of the pixel blocks through operation of the keyboard 103 and the mouse 104. This gives special visual effects on the video game; for example, the color of a background BG is gradually varied when a certain event occurs in the middle of a video game executed by the video game machine 20 (FIG. 3). A concrete circuit structure for decoding null run data will be described later in detail.

D. Concrete Structure of Inverse Quantization Table Generator

Figure 22:
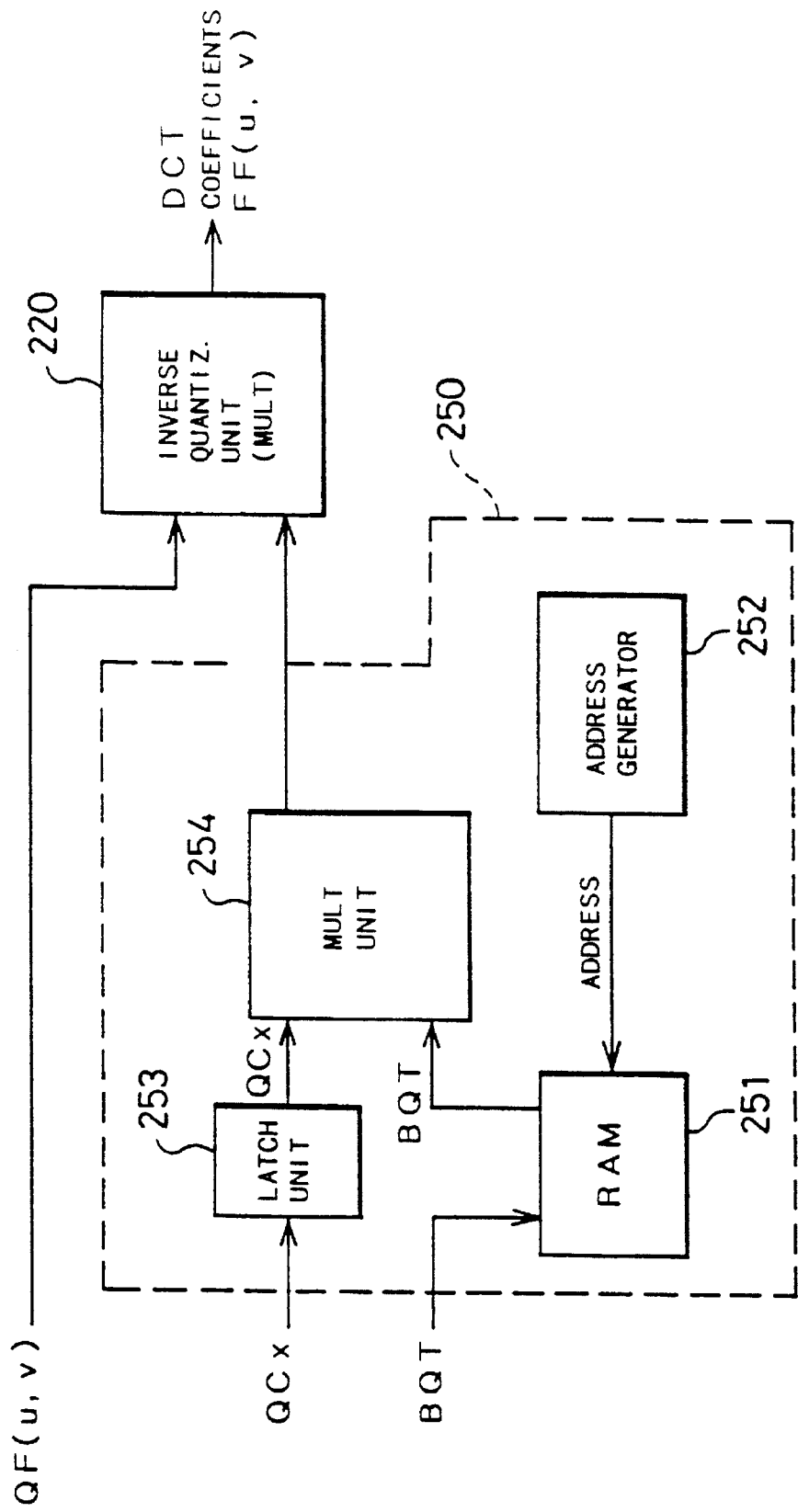
FIG. 22 is a block diagram showing the internal structure of the inverse quantization table generator.

FIG. 22 is a block diagram showing the internal structure of the inverse quantization table generator 250 shown in FIG. 1. The inverse quantization table generator 250 includes a RAM 251 for storing a basic quantization table BQT, an address generator circuit 252 for generating addresses of the RAM 251, a latch circuit 253 for latching and holding a quantization level coefficient QCx, and a multiplier unit 254 for creating a quantization table QT by multiplying the basic quantization table BQT by the quantization level coefficient QCx. The quantization table QT created by the multiplier unit 254 is then supplied to the inverse quantization unit 220.

When compressed image data ZZ stored in a CD-ROM is supplied to the Huffman decoding unit 210 (FIG. 1), code data of the basic quantization table BQT is first decoded and supplied to the RAM 251. The basic quantization table BQT is stored in the RAM 251 according to a write-address given from the address generator circuit 252. The basic quantization table BQT stored in the RAM 251 is applied to all pixel blocks.

The address generator circuit 252 generates a read-address in synchronism with quantized transform coefficients QF(u,v) output from the Huffman decoding unit 210, and the basic quantization table BQT is read out of the RAM 251 according to the read-address. In the meanwhile, a quantization level coefficient QCx decoded by the Huffman decoding unit 210 is latched by and held in the latch circuit 253 until a next quantization level coefficient QCx is given. Namely the same quantization level coefficient QCx is applied to a plurality of pixel blocks until another quantization level coefficient QCx is supplied.

Figure 23:
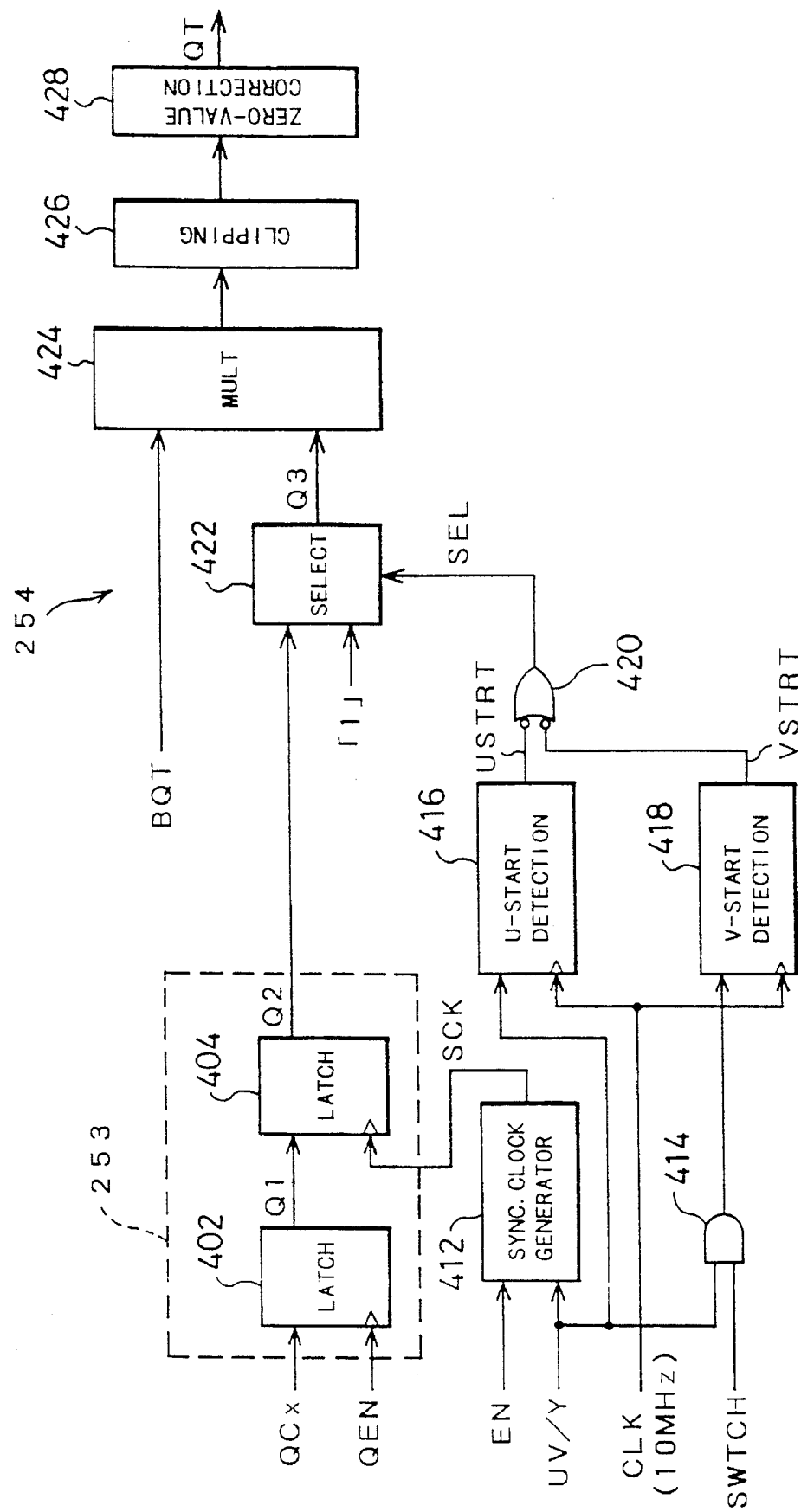
FIG. 23 is a block diagram showing the internal structure of a latch circuit and a multiplier unit included in the inverse quantization table generator.

FIG. 23 is a block diagram showing the internal structure of the latch circuit 253 and the multiplier unit 254 included in the inverse quantization table generator 250 of FIG. 22. The latch circuit 253 has two latches 402 and 404. The multiplier unit 254 includes a synchronizing clock generator 412, and an AND circuit 414, a U-signal start detection circuit 416, a V-signal start detection circuit 418, an NAND circuit 420, a selector 422, a multiplier 424, a clipping circuit 426, and a zero-value correction circuit 428.

FIGS. 24(a) through 24(l) are timing charts showing the operation of the circuitry shown in FIG. 23. When the quantization level coefficient QCx is decoded by the Huffman decoding unit 210 (FIG. 1), the decoded quantization level coefficient QCx is given together with an enable signal QEN to the latch circuit 253 (FIGS. 24(a) and 24(b)). The first latch 402 latches the quantization level coefficient QCx at a rising edge of the enable signal QEN and supplies an output Q1 to the second latch 404 (FIG. 24(c)).

After the basic quantization table BQT for Y signals is read four times, corresponding to blocks Y1 through Y4, out of the RAM 251 (FIG. 22), the basic quantization table BQT for U and V signals is read twice, corresponding to blocks U and V, as shown in FIG. 24(d).

The synchronizing clock generator 412 (FIG. 23) receives a block identification signal UV/Y output from the address generator circuit 252 in synchronism with the basic quantization table BQT read out of the RAM 251 as shown in FIG. 24(e). The block identification signal UV/Y has an L level during a period for Y signals and an H level during a period for U and V signals. An enable signal EN is also given to the synchronizing clock generator 412. The synchronizing clock generator 412 inverts the block identification signal UV/Y to generate a synchronizing clock signal SCK shown in FIG. 24(f), and supplies the synchronizing clock signal SCK to a clock input terminal of the second latch 404. The second latch 404 latches the output Q1 of the first latch 402 at a rising edge of the synchronizing clock signal SCK, and supplies an output Q2 shown in FIG. 24(g) to a data input terminal of the selector 422. A fixed value '1' is input to another data input terminal of the selector 422.

The U-signal start detection circuit 416 generates a U-start signal USTRT (FIG. 24(h)) indicating a start time of the basic quantization table BQT for U signals based on the block identification signal UV/Y and a reference clock signal CLK having a frequency of 10 MHz. The U-start signal USTRT holds an L level for 100 nano seconds after each rising edge of the block identification signal UV/Y.

The AND circuit 414 receives the block identification signal UV/Y and a block switching signal SWTCH shown in FIG. 24(i) which alternates its level at every start of the six blocks Y1 through Y4, U, and V. The V-signal start detection circuit 418 generates a V-start signal VSTRT (FIG. 24(j)) indicating a start time of the basic quantization table BQT for V signals based on an output of the AND circuit 414 and the reference clock signal CLK. The V-start signal VSTRT holds an L level for 100 nano seconds after that rising edge of the block switching signal SWTCH which occurs while the block identification signal UV/Y is at H level.

Figure 25:
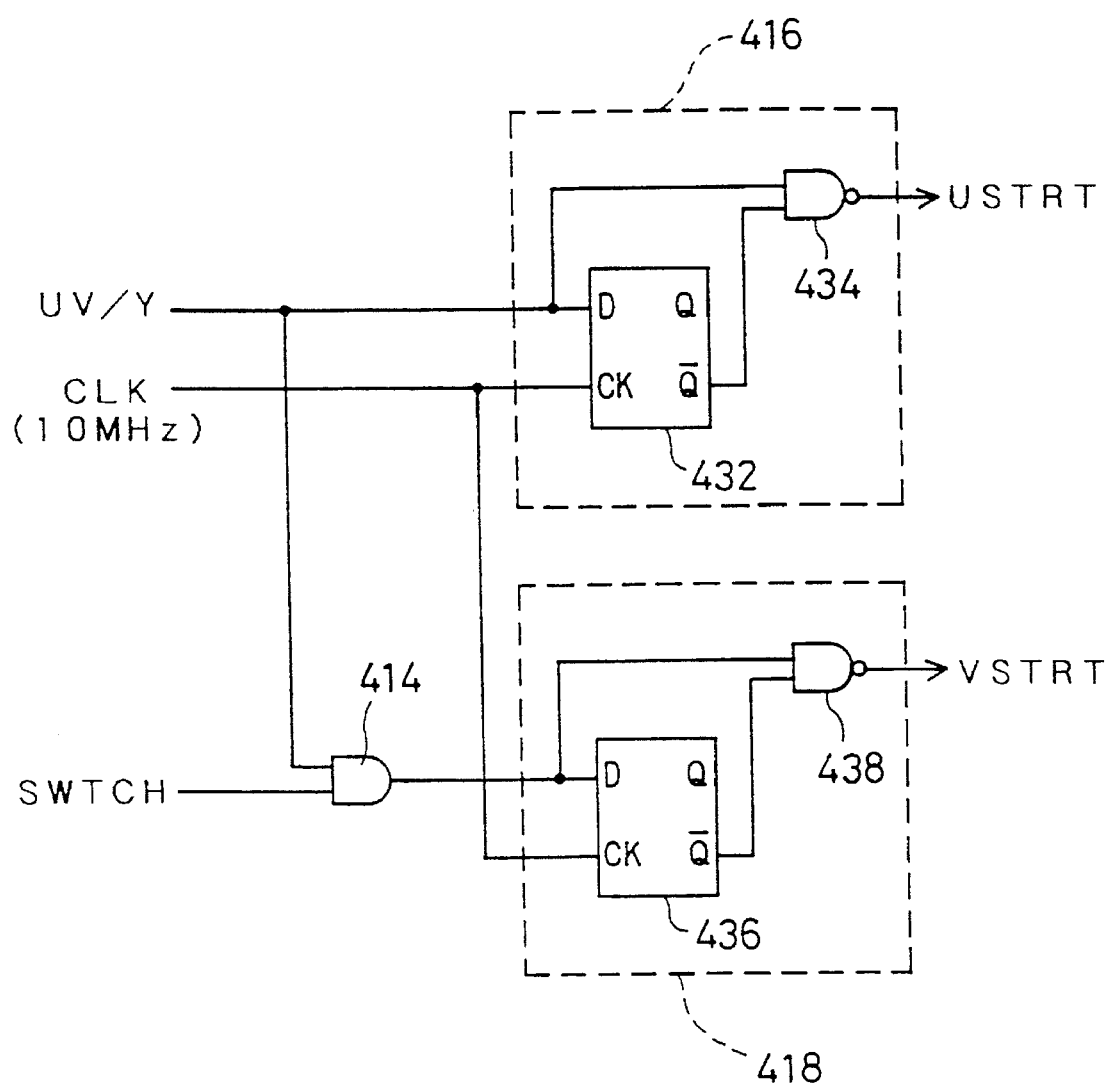
FIG. 25 is a block diagram showing the internal structure of a U-signal start detection circuit and a V-signal start detection circuit shown in FIG. 23.

FIG. 25 is a block diagram showing the internal structure of the U-signal start detection circuit 416 and the V-signal start detection circuit 418. Each of the detection circuits 416 and 418 includes one D flip-flop and an NAND circuit. D flip-flop 432 of the U-signal start detection circuit 416 receives the block identification signal UV/Y at a D input terminal and the reference clock signal CLK at a clock input terminal. An NAND circuit 434 is supplied with the block identification signal UV/Y and an inverse output of the D flip-flop 432. The block identification signal UV/Y is synchronous with the reference clock signal CLK.

Since the inverse output of the D flip-flop 432 has an H level while the block identification signal UV/Y is at L level, an output of the NAND circuit 434, that is, the U-start signal USTRT, is kept at H level (FIG. 24(h)). The output USTRT of the NAND circuit 434 becomes L level right after the level change of the block identification signal UV/Y from L level to H level, and returns to H level when the D flip-flop 432 latches an input at a rising edge of the reference clock signal CLK after 100 nano seconds.

The V-signal start detection circuit 418 including one D flip-flop 436 and an NAND circuit 438 functions in a similar manner to the U-signal start detection circuit 416. D input terminal of the D flip-flop 436 receives a logical multiplication (AND) of the block identification signal UV/Y and the block switching signal SWTCH. The V start signal VSTRT thus becomes L level 100 nano seconds after that rising edge of the block switching signal SWTCH which occurs while the block identification signal UV/Y is at H level.

The NAND circuit 420 (FIG. 23) receives the U-start signal USTRT and the V-start signal VSTRT, and supplies a selection signal SEL to a select input terminal of the selector 422. The selection signal SEL is kept at H level for 100 nano seconds at a beginning of the U signal block and the V signal block as shown in FIG. 24(k). The selector 422 outputs the signal Q2 given from the latch circuit 253 when the selection signal SEL is at L level, and outputs the fixed value '1' when the selection signal SEL is at H level. An output Q3 of the selector 422 is then multiplied by the basic quantization table BQT in the multiplier 424.

Figure 24:
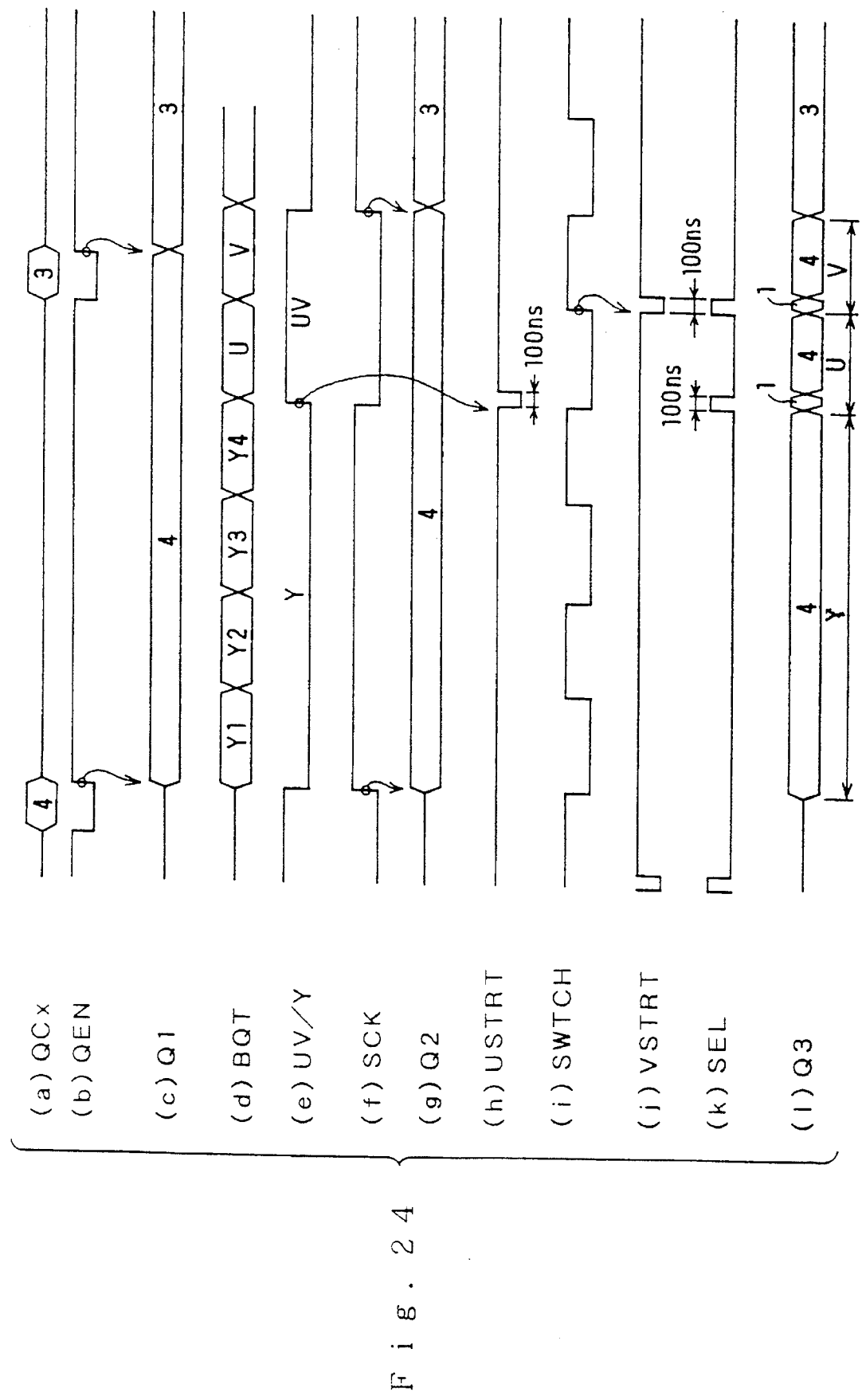
FIGS. 24(a) through 24(l) are timing charts showing the operation of circuitry shown in FIG. 23.

As shown in FIG. 24(*l*), the output Q3 of the selector 422 becomes equal to the fixed value '1' irrespective of the value of the quantization level coefficient QCx at the beginning of the U signal block and the V signal block. The time period of 100 nano seconds at the beginning of the U signal block and the V signal block are allocated to calculation of a quantization level for the DC component. The circuit structure of FIG. 23 therefore does not multiply the quantization level of the basic quantization table for the DC component by a specified quantization level coefficient QCx for U signal and V signal. In other words, the circuit of FIG. 23 implements the operation shown in FIGS. 8(*c*) and 8(*d*).

Figure 26:
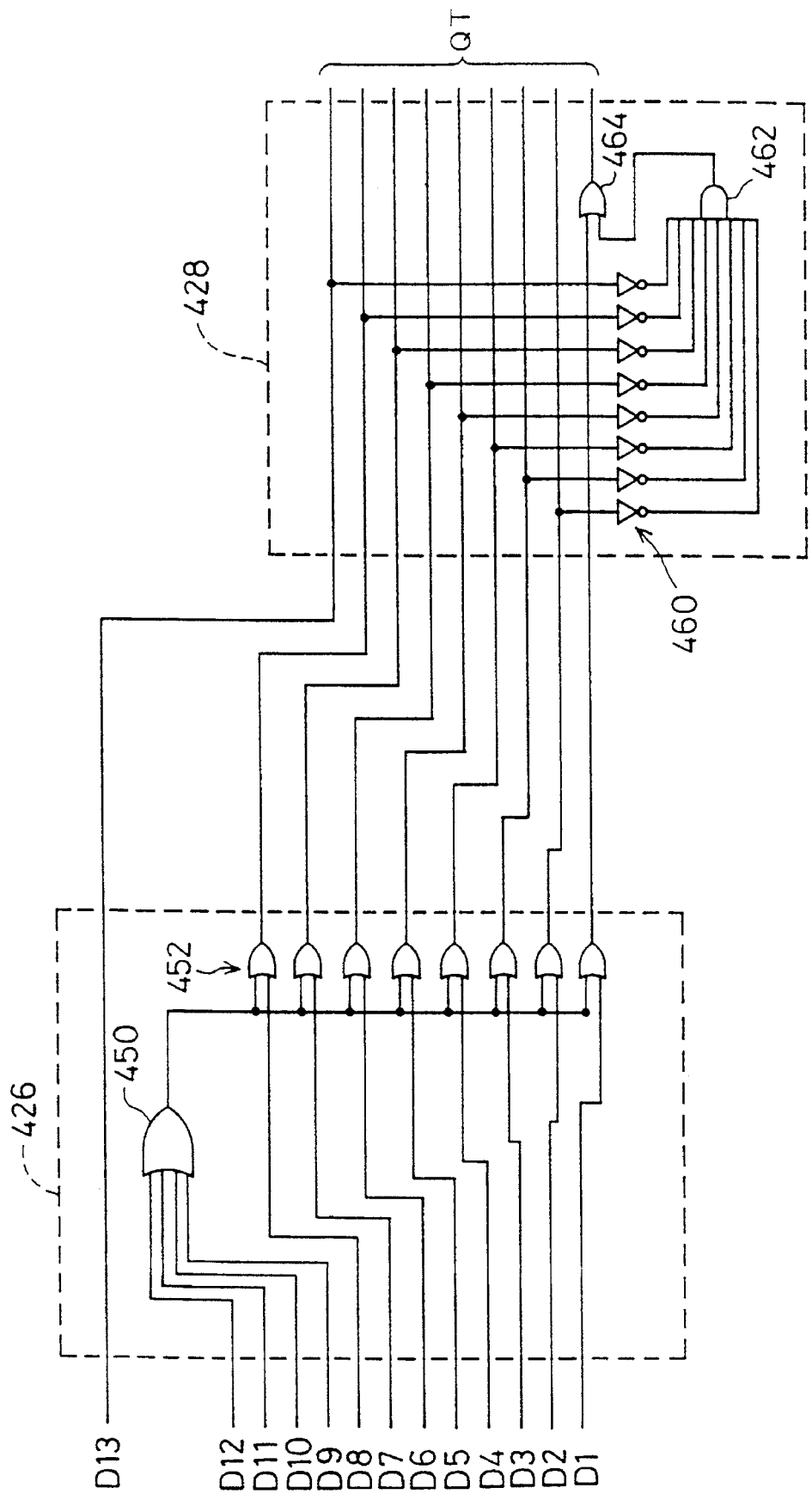
FIG. 26 is a block diagram showing the internal structure of a clipping circuit and a zero-value correction circuit shown in FIG. 23.

An output of the multiplier 424 is corrected by the clipping circuit 426 and the zero-value correction circuit 428 shown in FIG. 23 to make a quantization table QT. FIG. 26 is a block diagram showing the internal structure of the clipping circuit 426 and the zero-value correction circuit 428.

The clipping circuit 426 includes a 4-input OR circuit 450 and eight 2-input OR circuits 452. These OR circuits are applied to a 9-bit quantization level, where the most significant bit D13 is a sign bit. The 4-input OR circuit 450 receives upper four bits D9 through D12 (except the sign bit D13) out of 14-bit data output from the multiplier 424 (FIG. 23). Each of the eight 2-input OR circuits 452 receives an output of the 4-input OR circuit 450 at one input terminal and lower eight bits D1 through D8 out of the 14-bit data output from the multiplier 424 at the other input terminal. When at least one of the upper four bits D9 through D12 is equal to one, outputs of the eight 2-input OR circuits 452 are all equal to one, accordingly. In other words, when the output of the multiplier 424 is not less than 255 in decimal notation, the output of the clipping circuit 426 is set equal to 255, accordingly.

The zero-value correction circuit 428 transfers the outputs of the seven 2-input OR circuits 452 corresponding to the seven bits D2 through D8 in the clipping circuit 426. The seven outputs of the seven 2-input OR circuits 452 as well as the code bit D13 are given to eight inverters 460, respectively. Outputs of the eight inverters 460 are sent to an 8-input AND circuit 462, and an output of the AND circuit 462 is given to a 2-input OR circuit 464. The 2-input OR circuit 464 also receives an output of the 2-input OR circuit 452 corresponding to the lower-most bit D1. When the values of the thirteen bits D1 through D13 in the output of the multiplier 424 are all equal to zero, the zero-value correction circuit 428 outputs a quantization level QT having the value '1' at the least significant bit and the value '0' at the other eight bits. In other words, the zero-value correction circuit 420 implements the operation shown in FIGS. 9(*c*) and 9(*d*).

E. Decoding of Null Run Data

Figure 27:
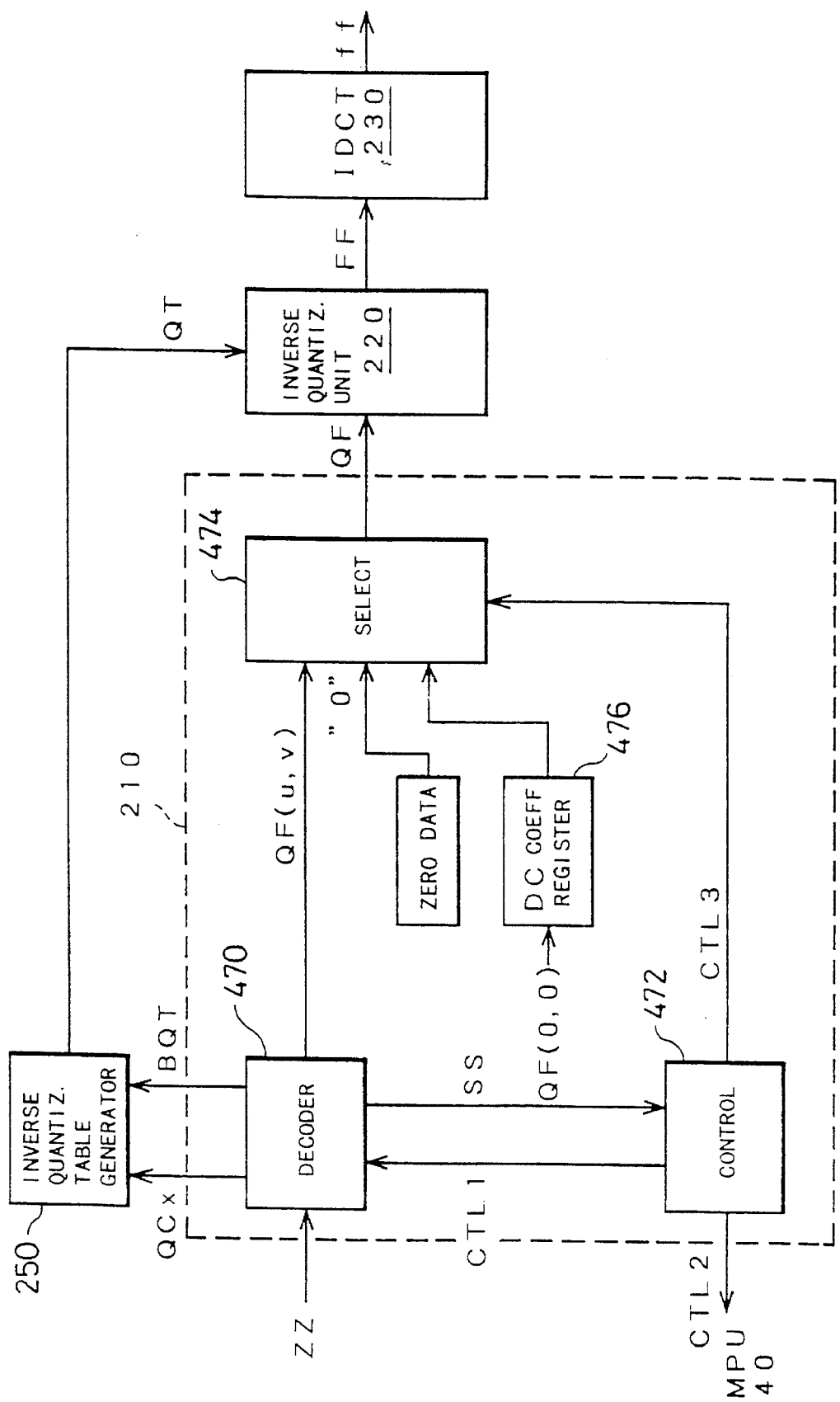
FIG. 27 is a block diagram showing the internal structure of a Huffman decoding unit of the image data decompression unit shown in FIG. 1.

FIG. 27 is a block diagram showing the internal structure of the Huffman decoding unit 210 of the image data decompression unit 200 shown in FIG. 1. The Huffman decoding unit 210 includes a decoder 470 for executing Huffman decoding on the compressed image data ZZ, a controller 472, a selector 474, and a DC coefficient register 476.

The decoder 470 judges a type of given compressed data; that is, a basic quantization table BQT, a quantization level coefficient QCx, block data, or null run data, and outputs a state signal SS representing the type of the compressed data to the controller 472. The controller 472 outputs first through third control signals CTL1, CTL2, and CTL3 to the decoder 470, the selector 474, and the MPU 40 of the video game machine 20 (FIG. 3), respectively, according to the state signal SS. The decoder 470 also outputs a decoded basic quantization table BQT and a decoded quantization level coefficient QCx to the inverse quantization table generator 250, and outputs decoded quantized transform coefficients QF(u,v) to the selector 474.

Data input terminals of the selector 474 receive zero data and a DC coefficient QF(0,0) stored in the DC coefficient register 476 as well as the quantized transform coefficients QF(u,v) given from the decoder 470. The DC coefficient register 476 is supplied from the MPU 40 with the DC coefficient QF(0,0) for the pixel blocks in series having a uniform color which is defined in a software program of a video game. The DC coefficient QF(0,0) has respective values for Y, U, and V signals.

Figure 28:
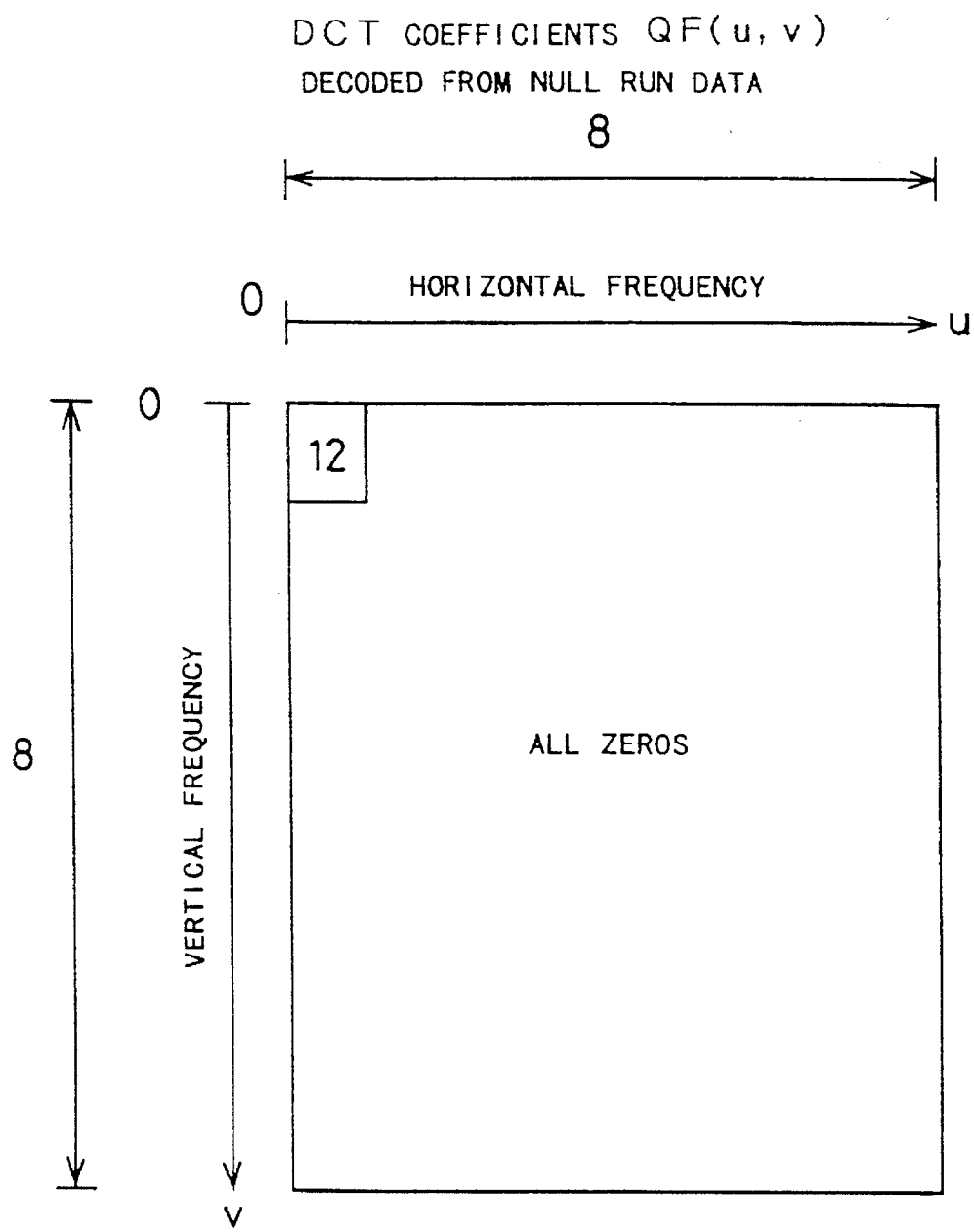
FIG. 28 shows DCT coefficients QF(u,v) generated by decoding null run data.

The two null run data NRD1 and NRD2 shown in FIG. 20C are decoded in the following procedure. The decoder 470 detects a DC coefficient code word 'NRL' placed at a beginning of the first null run data NRD1, and outputs a state signal SS representing the existence of null run data to the controller 472. According to the state signal SS, the controller 472 outputs the first and second control signals CTL1 and CTL2 to the decoder 470 and the MPU 40, respectively, to suspend a decoding process, and also outputs the third control signal CTL3 to make the selector 474 to select a DC coefficient QF(0,0) stored in the DC coefficient register 476 as a DC coefficient of a first block. When the value of original image data f(x,y) is equal to 12 as in the example of FIG. 20B, the DC coefficient QF(0,0)=12 is registered in the DC coefficient register 476. The controller 472 further controls the selector 474 to select zero data for all the 63 AC coefficients. FIG. 28 shows the transform coefficients QF(u,v) thus generated.

The first null run data NRD1 represents a series of sixteen pixel blocks having a uniform color. The same transform coefficients QF(u,v) shown in FIG. 28 is generated for each of the sixteen pixel blocks accordingly. As for the second null run data NRD2, the transform coefficients QF(u,v) shown in FIG. 28 is generated for the two pixel blocks in the same manner.

After completion of processing for null run data, the controller 472 outputs the first and second control signals CTL1 and CTL2 to the decoder 470 and the MPU 40 to resume the decoding process. The values of the luminance signal Y and the color difference signals U and V for the series of pixel blocks specified to have a uniform color by null run data are readily varied by changing the value of the DC coefficient written in the DC coefficient register 476 by the MPU 40. Namely, with the null run data, the uniform color of an image area may be varied to any desirable color according to data other than compressed image data. In the embodiment, the values of the luminance signal Y and the color difference signals U and V for the series of pixel blocks painted with a uniform color are specified in a software program defining a video game.

Figure 29:
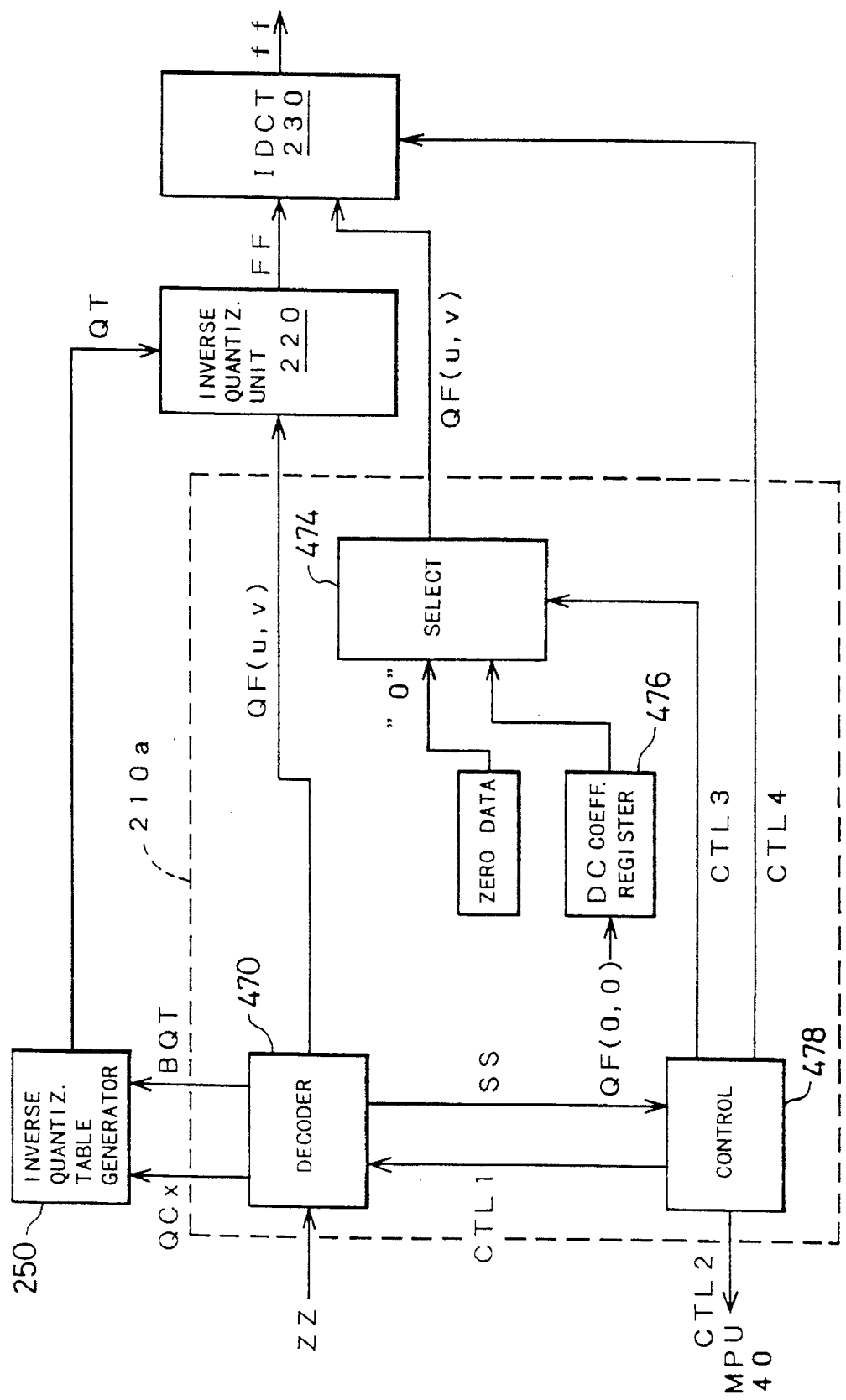
FIG. 29 is a block diagram showing another Huffman decoding unit having a different structure.

FIG. 29 is a block diagram showing another Huffman decoding unit 210*a* having a different structure. In the Huffman decoding unit 210*a*, quantized transform coefficients QF(u,v) output from the decoder 470 is given directly to the inverse quantization unit 220 while bypassing the selector 474. The selector 474 selects one of the DC coefficient QF(0,0) given from the DC coefficient register 476 and the zero data, and gives the selected value directly to the IDCT unit 230 but not via the inverse quantization unit 220. A control unit 478 outputs a fourth control signal CTL4 to the IDCT unit 230 as well as the first through third control signals CTL1 through CTL3 output in the same manner as FIG. 27.

The control unit 478 outputs the first, the second, and the fourth control signals CTL1, CTL2, and CTL4 to the decoder 470, the MPU 40, and the IDCT unit 230, respectively, according to the state signal SS representing the type of compressed data. When block data unit is decoded in the decoder 470, the decoded transform coefficients QF(u,v) are given to the inverse quantization unit 220.

When the decoder 470 detects a DC coefficient code word of 'NRL' placed at a beginning of the first null run data NRD1 shown in FIG. 20C, and it outputs a state signal SS representing the existence of null run data to the control unit 478. In response to the state signal SS, the control unit 478 outputs the first and second control signals CTL1 and CTL2 to the decoder 470 and the MPU 40, respectively, to suspend the decoding process, and changes the level of the third control signal CTL3 to make the selector 474 to select the DC coefficient QF(0,0) stored in the DC coefficient register 476. The control unit 478 further controls the selector 474 to select zero data for all the 63 AC coefficients. The control unit 478 simultaneously outputs the fourth control signal CTL4 to the IDCT unit 230 to make the IDCT unit 230 to select the output of the selector 474 as data subject to the inverse discrete cosine transform.

After completion of the processing for null run data, the control unit 478 outputs the first and second control signals CTL1 and CTL2 to the decoder 470 and the MPU 40 to resume the decoding process.

Since the transform coefficients QF(u,v) output from the selector 474 during processing of null run data are supplied directly to the IDCT unit 230 while bypassing the inverse quantization unit 220, the circuitry shown in FIG. 29 can reduce quantization error. For example, in a chroma key process of detecting an image part of a specific color and making the image part transparent with the video encoder unit 50 (FIG. 3), minimum operation error in the quantization process allows pixel blocks of a desired color to be accurately and securely made transparent.

Although only the DC coefficient is arbitrarily set for the pixel blocks represented by the null run data in the above embodiment, the structure can be modified to set some of the AC coefficients, for example, QF(1,0) and QF(0,1), for the pixel blocks represented by the null run data. In this case, the null run data represents the number of pixel blocks in series having an identical image pattern.

F. Modifications

There can be many modifications, changes, and alterations without departing from the scope or spirit of essential characteristics of the invention. Some examples of modifications are given below.

(1) The present invention is applicable to any orthogonal transform such as K-L transform and Hadamard transform as well as the two-dimensional discrete cosine transform described in the above embodiment. As for entropy coding, any coding process such as arithmetic coding and MEL coding can be used instead of the Huffman coding.

Figure 30:
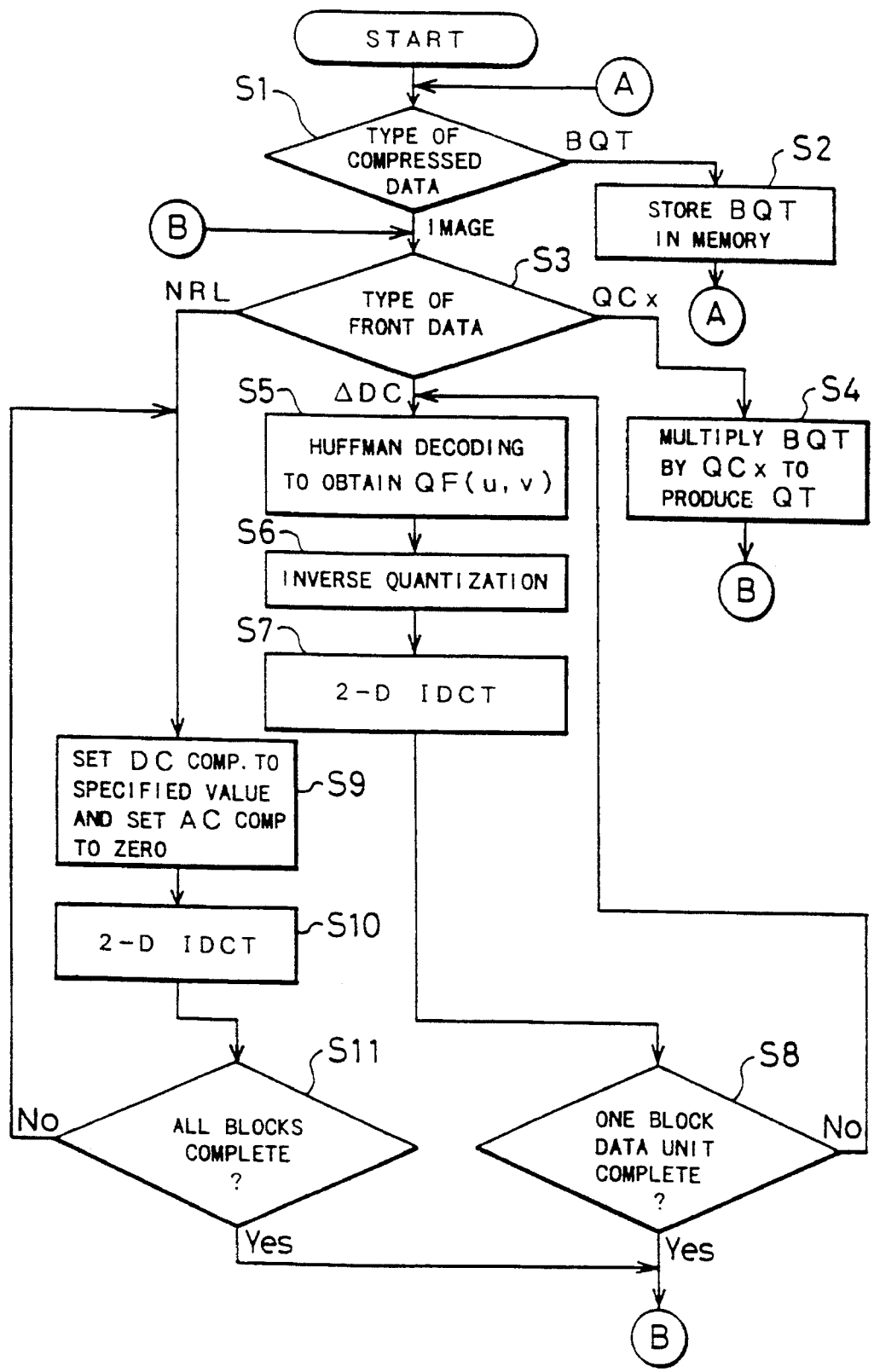
FIG. 30 is a flowchart showing a process of decompressing compressed data implemented by a software program.
Figure 31:
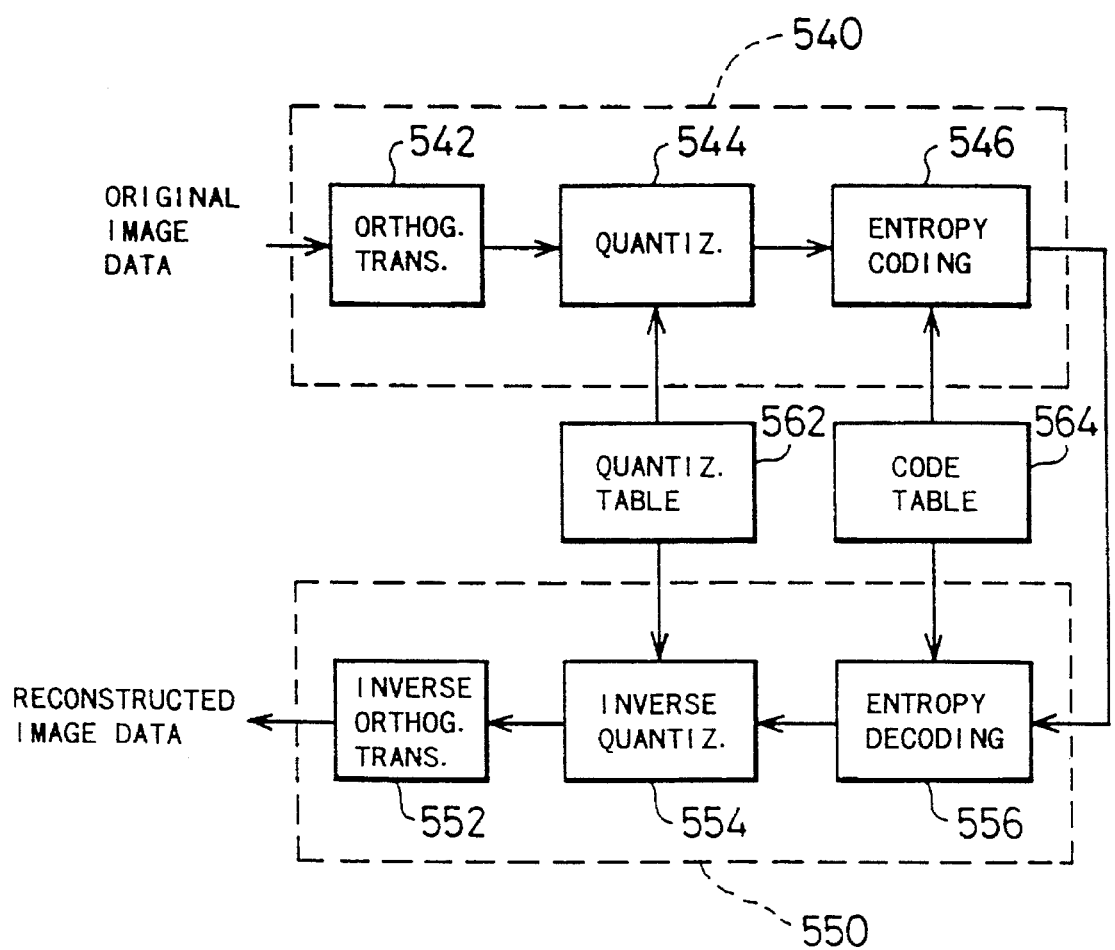
FIG. 31 is a block diagram showing the conventional image data compression unit and decompression unit.

(2) The image data compression unit 100 and/or the image data decompression unit 200 can be implemented by either of hardwares or software programs. FIG. 30 is a flowchart showing a process of decompressing the compressed data implemented by a software program. At step S1, the type of compressed data is identified according to a header part of the compressed data. When the compressed data represents the basic quantization table BQT, the program goes to step S2 at which the basic quantization table BQT is stored in a memory and returns to step S1.

When the compressed data represents an image, the program goes to step S3, at which the type of the front data at the front end of each data unit included in the compressed data part of the compressed data is identified. The data unit represents a unit of code data corresponding to a quantization level coefficient QCx, a block data unit, and null run data shown in FIG. 18C. As shown in FIGS. 18C, 18D, 18E, and 18F, the front data of each data unit is either of a Huffman code word representing a quantization level coefficient QCx, a Huffman code word representing a difference ΔDC of DC coefficients in block data, and a Huffman code word NRL representing the existence of null run data.

When the front data is a Huffman code word representing a quantization level coefficient QCx, the program goes to step S4 at which a quantization table QT is generated by multiplying the basic quantization table BQT by the quantization level coefficient QCx. In this multiplication process, the features described before are also implemented: that is, (1) the products of multiplication not less than a predetermined maximum quantization level are set equal to the predetermined maximum value; (2) the DC coefficients are not quantized; and (3) when the quantization level coefficient QCx is equal to zero, all the quantization levels are set equal to one. After generating the quantization table QT at step S4, the program returns to step S3.

When the front data is identified as a Huffman code word of a DC coefficient difference ΔDC, the program proceeds to step S5 at which quantized transform coefficients QF(u,v) are obtained by decoding one data unit for one pixel block. After inverse quantization at step S6, the program goes to step S7 at which two-dimensional inverse discrete cosine transform is executed on the decoded transform coefficients FF(u,v). At step S8, it is determined whether the processing of steps S5 through S7 is completed for all the six pixel blocks included in one unit of block data (FIG. 18D). When the processing is complete for all the six pixel blocks, the program returns to step S3.

When the front data is judged to be a Huffman code word NRL representing the existence of null run data, the program goes to step S9 at which a DC component of one pixel block is set equal to a predetermined value while all the 63 AC components are set equal to zero. At step S10, two-dimensional inverse discrete cosine transform is executed on the transform coefficients thus determined. At step S11, it is judged whether the processing of steps S9 and S10 is completed for all the pixel blocks represented by the null run data. When the processing is complete for all the pixel blocks, the program returns to step S3. Image data ff(x,y) is accordingly reconstructed through execution of the processing of steps S3 through S11 for all data units in the compressed data part.

(3) The present invention is applicable to any type of image processing apparatus other than video game machines as described in the above embodiment.

(4) Although the quantization level coefficient QCx and each quantization level in the quantization table QT are integers in the above embodiment, they can be decimal numbers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of decompressing compressed image data including code data generated by successively executing orthogonal transform, quantization, and entropy encoding on image data, said method comprising the steps of:

a) providing said compressed image data including said code data for a plurality of pixel blocks in an image, a first coefficient code representing a first quantization-level factor for a first pixel block of a predetermined size, and a second coefficient code representing a second quantization-level factor for a second pixel block of said predetermined size;

providing a direct-current code table defining a coefficient code for a direct current component of quantized transform coefficients, and an alternating-current code table defining a coefficient code for alternating current components of said quantized transform coefficients;

b) executing entropy-decoding on said code data with said direct-current code table and said alternating current code table to generate quantized transform coefficients for said plurality of pixel blocks, and executing said entropy-decoding on said first and second coefficient codes with said direct-current code table to generate said first and second quantization-level factors, respectively, each of said first and second coefficient codes being defined by said direct-current code table;

c) multiplying predetermined basic quantization levels of a basic quantization table by said first and second quantization-level factors to generate first and second quantization tables, respectively, said first quantization table being used for said pixel block and successive pixel blocks after said first pixel block, and said second quantization table being used for said second block and successive pixel blocks after said second pixel block;

d) inversely quantizing said quantized transform coefficients for said first and second pixel blocks with said first and second quantization tables, respectively, to thereby obtain inversely-quantized transform coefficients; and e) executing an inverse orthogonal transform on said inversely-quantized transform coefficient to obtain decompressed image data.

2. A method of decompressing compressed image data including code data generated by successively executing orthogonal transform, quantization, and entropy encoding on image data, said method comprising the steps of:

a) providing said compressed image data including said code data for a plurality of pixel blocks in an image, a first coefficient code representing a first quantization-level factor for a first pixel block of a predetermined size, and a second coefficient code representing a second quantization-level factor for a second pixel block of said predetermined size;

providing a direct-current code table defining a coefficient code for a direct current component of quantized transform coefficients, and an alternating-current code code table defining a coefficient code for alternating current components of said quantized transform coefficients;

b) executing entropy-decoding on said code data with said direct-current code table and said alternating current code table to generate quantized transform coefficients for said plurality of pixel blocks, and executing said entropy-decoding on said first and second coefficient codes with said direct-current code table to generate said first and second quantization-level factors, respectively;

c) multiplying predetermined basic quantization levels of a basic quantization table by said first and second quantization-level factors to generate first and second quantization tables, respectively, said first quantization table being used for said pixel block and successive pixel blocks after said first pixel block, and said second quantization table being used for said second block and successive pixel blocks after said second pixel block, a quantization level of said first and second quantization tables being equal to a predetermined maximum value when said quantization level obtained by said multiplication is not less than said predetermined maximum value;

d) inversely quantizing said quantized transform coefficients for said first and second pixel blocks with said first and second quantization tables, respectively, to thereby obtain inversely-quantized transform coefficients; and e) executing an inverse orthogonal transform on said inversely-quantized transform coefficient to obtain decompressed image data.

3. A method of decompressing compressed image data including code data generated by successively executing orthogonal transform, quantization, and entropy encoding on image data, said method comprising the steps of:

a) providing said compressed image data including said code data for a plurality of pixel blocks in an image, an identical-pattern block data indicating a number of identical pixel blocks in said image, said identical pixel blocks having an identical image pattern and a predetermined size including a plurality of pixels;

b) executing entropy-decoding on said code data to generate first quantized transform coefficients for said plurality of pixel blocks, and to generate second quantized transform coefficients for said identical pixel blocks by setting a specific component of said second quantized transform coefficient to a predetermined value while setting all of said second quantized transform coefficients other than said specific component to zero;

c) inversely quantizing said first quantized transform coefficients with a quantization table, to thereby obtain first inversely-quantized transform coefficients; and d) executing an inverse orthogonal transform on said inversely-quantized transform coefficients to obtain decompressed image data.

4. A method according to claim 3, wherein said specific component of said second quantized transform coefficients is a direct current component.

5. A method according to claim 3, wherein said step (c) comprises the step of inversely quantizing said second quantized transform coefficients with a quantization table, to thereby obtain second inversely-quantized transform coefficients; and said step (d) comprises the step of executing an inverse orthogonal transform on said second inversely-quantized transform coefficients to obtain said decompressed image data.

6. An apparatus for decompressing compressed image data including code data generated by successively executing orthogonal transform, quantization, and entropy coding on image data, said apparatus comprising:

a memory for storing compressed image data including said code data for a plurality of pixel blocks in an image, a first coefficient code representing a first quantization-level factor for a first pixel block of a predetermined size, and a second coefficient code representing a second quantization-level factor for a second pixel block of said predetermined size;

direct-current code table means for defining a coefficient code for a direct current component of quantized transform coefficients;

alternating current code table means for defining a coefficient code for alternating current components of said quantized transform coefficients;

entropy-decoding means for executing entropy-decoding on said code data with said direct-current code table means and said alternating current code table means to generate quantized transform coefficients for said plurality of pixel blocks, and executing entropy-decoding on said first and second coefficient codes with said direct current code table means to generate said first and second quantization-level factors, respectively, each of said first and second coefficient codes being defined by said direct current code table means;

inverse-quantization table generation means for multiplying predetermined basic quantization levels of a basic quantization table by said first and second quantization-level factors to generate first and second quantization tables, respectively, said first quantization table being used for said first pixel block and successive pixel blocks after said first pixel block, and said second quantization table being used for said second pixel block and successive pixel blocks after said second pixel block;

inverse quantization means for inversely quantizing said quantized transform coefficients for said first and second pixel blocks with respect to said first and second quantization tables, respectively, to thereby obtain inversely-quantized transform coefficients; and inverse orthogonal transform means for executing an inverse orthogonal transform on said inversely-quantized transform coefficients to obtain decompressed image data.

7. An apparatus for decompressing compressed image data including code data generated by successively executing orthogonal transform, quantization, and entropy coding on image data, said apparatus comprising:

a memory for storing compressed image data including said code data for a plurality of pixel blocks in an image, a first coefficient code representing a first quantization-level factor for a first pixel block of a predetermined size, and a second coefficient code representing a second quantization-level factor for a second pixel block of said predetermined size;

direct-current code table means for defining a coefficient code for a direct current component of quantized transform coefficients;

alternating-current code table means for defining a coefficient code for alternating current components of said quantized transform coefficients;

entropy-decoding means for executing entropy-decoding on said code data with said direct current code table means and said alternating current code table means to generate quantized transform coefficients for said plurality of pixel blocks, and executing said entropy-decoding on said first and second quantization-level factors, respectively, each of said first and second coefficient codes being defined by said direct current code table means;

inverse-quantization table generation means for multiplying predetermined basic quantization levels of a basic quantization table by said first and second quantization-level factors to generate first and second quantization tables, respectively, said first quantization table being used for said first pixel lock and successive pixel blocks after said first pixel block, and said second quantization table being used for said second pixel block and successive pixel blocks after said second pixel block, said inverse-quantization table generation means comprising clipping means for making a quantization level of said first and second quantization tables equal to a predetermined maximum value when said quantization level obtained by said multiplication is not less than said predetermined maximum value;

inverse quantization means for inversely quantizing said quantized transform coefficients for said first and second pixel blocks with respect to said first and second quantization tables, respectively, to thereby obtain inversely-quantized transform coefficients; and inverse orthogonal transform means for executing an inverse orthogonal transform on said inversely-quantized transform coefficients to obtain decompressed image data.

8. An apparatus for decompressing compressed image data including code data generated by successively executing orthogonal transform, quantization, and entropy coding on image data, said apparatus comprising:

first memory for storing compressed image data including code data for a plurality of pixel blocks in an image, and identical-pattern block data indicating a number of identical pixel blocks in said image which have an identical image pattern;

a second memory for storing a specified value for a prescribed component of transform coefficients for said plurality of identical pixel blocks;

direct-current code table means for defining a coefficient code for a direct current component of quantized transform coefficients;

alternating-current code table means for defining a coefficient code for alternating current components of said quantized transform coefficients;

entropy decoding means for executing entropy-decoding on said code data with said direct-current code table means and said alternating current code table means to generate first quantized transform coefficients for said plurality of pixel blocks, and for generating second quantized transform coefficients for said identical pixel blocks by setting a specific component of said second quantized transform coefficients to said specified value stored in said second memory while setting all of said second quantized transform coefficients other than said specific component to zero;

inverse quantization means for inversely quantizing said first quantized transformed coefficients with a quantization table, to thereby obtain first inversely-quantized transform coefficients; and inverse orthogonal transform means for executing an inverse orthogonal transform on said first inversely-quantized transform coefficients to obtain decompressed image data.

9. An apparatus according to claim 8, wherein said specific component of said second quantized transformed coefficients is a direct current component.

10. An apparatus according to claim 8, wherein said entropy decoding means comprises:

means for supplying said second quantized transform coefficients decoded from said identical-pattern block data to said inverse orthogonal transform means while bypassing said inverse quantization means.

11. A method of compressing image data, comprising the steps of:

provinding a direct-current code table defining a coefficient code for a direct current component of quantized transform coefficients, and an alternate-current code table defining a coefficient code for alternate current components of said quantized transform coefficients;

a) executing an orthogonal transform on image data with respect to each of a plurality of pixel blocks of a predetermined size in an image to obtain transform coefficients for said plurality of pixel blocks;

b) specifying a first coefficient for a first pixel block, and a second coefficient for a second pixel block said first and second pixel blocks having said predetermined size;

c) multiplying predetermined basic quantization levels of a basic quantization table by said first and second coefficients to generate first and second quantization tables, respectively;

d) quantizing said transform coefficients for said first and second pixel blocks with said first and second quantization tables, respectively, to thereby obtain quantized transform coefficients;

e) executing entropy-coding on said quantized transform coefficients with said direct-current code table and said alternate-current code table to generate code data, and executing entropy-coding on said first and second coefficients with said direct-current code table to generate first and second coefficient codes, respectively; and f) generating compressed image data including sid code data, and said first and second coefficient codes.

12. A method of compressing image data, comprising the steps of:

a) specifying successive identical pixel blocks in an image, said identical pixel blocks having an identical image pattern;

b) executing orthogonal transform on image data with respect to each of a plurality of pixel blocks in said image other than said successive identical pixel blocks, to thereby obtain transform coefficients for said plurality of pixel blocks;

c) quantizing said transform coefficients for said plurality of pixel blocks, respectively, to thereby obtain quantized transform coefficients;

d) executing entropy-coding on said quantized transform coefficients to generate code data;

e) generating identical-pattern block data indicating a number of said successive identical pixel blocks said identical pixel blocks having an identical image pattern and an identical size including a plurality of pixels; and f) generating said compressed image data including said identical-pattern block data as well as said code data.

13. A method of decompressing compressed image data including code data generated by successively executing orthogonal transform, quantization, and entropy coding on image data, said method comprising the steps of:

a) providing said compressed image data including said code data for a plurality of pixel blocks in an image, and identical-pattern block data indicating a number of identical pixel blocks in said image, said identical pixel blocks having an identical image pattern and a predetermined size including a plurality of pixels;

b) executing entropy-decoding on said code data to generate first quantized transform coefficients for said plurality of pixel blocks, and to generate second quantized transformed coefficients for said identical pixel blocks by setting a specific component of said second quantized transform coefficients to a predetermined value while setting all of said second quantized transformed coefficients other than said specific component to zero;

c) inversely quantizing said first quantized transformed coefficients with a quantization table, to thereby obtain first inversely-quantized transformed coefficients; and d) executing an inverse orthogonal transform on said first inversely-quantized transform coefficients and said second transform coefficients to obtain decompressed image data.

* * * * *